US011995658B2

(12) United States Patent
Arcot Omkar et al.

(10) Patent No.: US 11,995,658 B2
(45) Date of Patent: May 28, 2024

(54) MACHINE LEARNING-BASED DETECTION OF POTENTIALLY MALICIOUS BEHAVIOR ON AN E-COMMERCE PLATFORM

(71) Applicant: Dell Products L.P., Round Rock, TX (US)

(72) Inventors: Tanuj Arcot Omkar, Cedar Park, TX (US); Rodrigo de Souza Scorsatto, Porto Alegre (BR); Rodrigo da Rosa Righi, São Leopoldo (BR); Lucas Micol Policarpo, São Leopoldo (BR); Vinicius Facco Rodrigues, São Leopoldo (BR); Jorge Luis Victória Barbosa, São Leopoldo (BR); Rodolfo Stoffel Antunes, São Leopoldo (BR); Cristiano André da Costa, São Leopoldo (BR)

(73) Assignee: Dell Products L.P., Round Rock, TX (US)

( * ) Notice: Subject to any disclaimer, the term of this patent is extended or adjusted under 35 U.S.C. 154(b) by 30 days.

(21) Appl. No.: 17/824,555

(22) Filed: May 25, 2022

(65) Prior Publication Data

US 2023/0385837 A1 Nov. 30, 2023

(51) Int. Cl.
*G06Q 20/40* (2012.01)
*G06F 18/214* (2023.01)
*G06N 3/08* (2023.01)

(52) U.S. Cl.
CPC ....... *G06Q 20/4016* (2013.01); *G06F 18/214* (2023.01); *G06N 3/08* (2013.01); *G06Q 20/4014* (2013.01)

(58) Field of Classification Search
None
See application file for complete search history.

(56) References Cited

U.S. PATENT DOCUMENTS

| | | | | |
|---|---|---|---|---|
| 11,205,179 | B1 * | 12/2021 | Patel | G06Q 20/4016 |
| 2007/0192863 | A1 * | 8/2007 | Kapoor | H04L 67/10 726/23 |

(Continued)

FOREIGN PATENT DOCUMENTS

| | | | | |
|---|---|---|---|---|
| CN | 104700828 A | * 6/2015 | G10L 15/02 |
| IN | 202231044706 A | * 8/2022 | |

OTHER PUBLICATIONS

V. F. Rodrigues et al., "Fraud Detection and Prevention in E-commerce: An Updated Systematic Literature Review," IEEE Transactions on Knowledge and Data Engineering, vol. 21, No. 5, May 2021, 19 pages.

(Continued)

*Primary Examiner* — Bruce I Ebersman
*Assistant Examiner* — Matthew Cobb
(74) *Attorney, Agent, or Firm* — Ryan, Mason & Lewis, LLP

(57) ABSTRACT

An apparatus comprises a processing device configured to monitor for events associated with users interacting with an e-commerce platform, to identify an event type of a given event associated with a given user interacting with the e-commerce platform, and to select, based on the identified event type, at least one of a plurality of machine learning models configured to characterize different types of potentially malicious behavior on the e-commerce platform. The processing device is also configured to determine, utilizing the selected at least one machine learning model, whether the given user is exhibiting at least one of the different types of potentially malicious behavior. The processing device is also configured, responsive to determining that the given user is exhibiting at least one of the different types of potentially malicious behavior, to initiate actions on the e-commerce platform to prevent or mitigate an effect of the potentially malicious behavior.

20 Claims, 31 Drawing Sheets

(56) References Cited

U.S. PATENT DOCUMENTS

| | | | | |
|---|---|---|---|---|
| 2013/0346302 A1* | 12/2013 | Purves | G06Q 20/102 | 705/40 |
| 2017/0070523 A1* | 3/2017 | Bailey | H04L 63/20 | |
| 2020/0396233 A1* | 12/2020 | Luo | G06N 3/08 | |
| 2021/0241171 A1* | 8/2021 | Bonaci | G06N 20/00 | |
| 2023/0169552 A1* | 6/2023 | Omkar | G06Q 30/0601 | 705/26.1 |

OTHER PUBLICATIONS

L. M. Policarpo et al., "Machine Learning Through the Lens of e-Commerce Initiatives: An Up-to-date Systematic Literature Review," Computer Science Review, vol. 41, Aug. 2021, 17 pages.
Apache Software Foundation, "Apache Kafka," https://kafka.apache.org/, Accessed Mar. 24, 2022, 4 pages.
Timescale, Inc. "Time-series Data Simplified," https://www.timescale.com/, Accessed Mar. 24, 2022, 12 pages.
Redis Ltd. "Redis: A Vibrant, Open Source Database," https://redis.io/, Accessed Mar. 24, 2022, 3 pages.
The Postgresql Global Development Group, "PostgreSQL: The World's Most Advanced Open Source Relational Database," https://www.postgresql.org/, Accessed Mar. 24, 2022, 4 pages.
A. Sherstinsky, "Fundamentals of Recurrent Neural Network (RNN) and Long Short-Term Memory (LSTM) Network," Physica D: Nonlinear Phenomena, arXiv:1808.03314v9, Jan. 31, 2021, 43 pages.
Apache Software Foundation, "Apache Kafka Introduction," https://kafka.apache.org/intro, Accessed May 25, 2022, 4 pages.
Splunk, "Splunk® Enterprise™ Log Management Role Supporting the ISO 27002 Framework," Executive Brief, Jul. 2012, 6 pages.
Wikipedia, "Multilayer Perceptron," https://en.wikipedia.org/wiki/Multilayer_perceptron, Apr. 12, 2022, 3 pages.

* cited by examiner

500

| FIELD | DESCRIPTION |
|---|---|
| _TIME | EVENT CAPTURE TIME BY THE E-COMMERCE PLATFORM. |
| MCMID | USER UNIQUE IDENTIFICATION BASED ON THE WEB BROWSER COOKIES. |
| BROWSER_VERSION | USER WEB BROWSER VERSION. |
| COUNTRY | THE COUNTRY OF THE E-COMMERCE WEB PAGE THE USER IS BROWSING. |
| CUSTOMERSET | CUSTOMER CLASSIFICATION. |
| SEGMENT | THE E-COMMERCE SECTOR REFERRING TO THE PAGE THE USER IS ON |
| DGV | INFORMATION ABOUT HOW THE USER ENTERED THE SITE |
| ISBOT | CLASSIFICATION DEFINING THE USER AS "BOT" OR "NON-BOT". |
| PAGETYPE | CATEGORY REFERRING TO THE URL OF THE E-COMMERCE WHERE THE USER IS BROWSING |
| URL | URL THE USER REQUESTED. |
| REFERRER | THE PREVIOUS URL THE USER VISITED |

| FIELD | DESCRIPTION |
|---|---|
| _TIME | EVENT CAPTURE TIME BY THE E-COMMERCE PLATFORM. |
| MCMID | USER UNIQUE IDENTIFICATION BASED ON THE WEB BROWSER COOKIES. |
| IPADDRESS | USER'S IP ADDRESS. |
| IP_COUNTRY | IP ADDRESS COUNTRY. |
| IP_CITY | IP ADDRESS CITY. |
| SESSIONID | A UNIQUE IDENTIFIER REPRESENTING THE CUSTOMER SESSION. |
| PROFILEID | A UNIQUE IDENTIFIER REPRESENTING THE CUSTOMER PROFILE. |
| LOGGEDIN | A FLAG THAT REPRESENTS WHETHER THE USER IS LOGGED IN OR NOT. |
| X_FORWARDED_FOR | THE NUMBER OF NETWORK HOPS FROM THE CUSTOMER CLIENT TO THE SERVER. |
| USER_AGENT | INFORMATION ABOUT THE DEVICE AND BROWSER OF THE USER. |
| CSH | SALTED HASH OF THE CREDIT CARD INFORMATION |
| COUNTRY | THE COUNTRY OF THE E-COMMERCE WEB PAGE THE USER IS BROWSING. |
| URL | URL THE USER REQUESTED. |

| FIELD | DESCRIPTION |
|---|---|
| _TIME | EVENT CAPTURE TIME BY THE E-COMMERCE PLATFORM. |
| MCMID | USER UNIQUE IDENTIFICATION BASED ON THE WEB BROWSER COOKIES. |
| IPADDRESS | USER'S IP ADDRESS. |
| IP_COUNTRY | IP ADDRESS COUNTRY. |
| SESSIONID | A UNIQUE IDENTIFIER REPRESENTING THE USER'S SESSION. |
| FORMFACTOR | TYPE OF DEVICE OF THE USER |
| BROWSER | BROWSER NAME |
| DEVICE | USER DEVICE MODEL |
| OS | USER'S OPERATING SYSTEM. |
| LOGGEDIN | A FLAG THAT REPRESENTS WHETHER THE USER IS LOGGED IN OR NOT. |
| PROFILEID | A UNIQUE IDENTIFIER REPRESENTING THE CUSTOMER PROFILE. |
| DPID | ORDER UNIQUE IDENTIFIER |
| COUNTRY | THE COUNTRY OF THE E-COMMERCE WEB PAGE THE USER IS BROWSING. |
| SEGMENT | THE SECTOR REFERRING TO THE PAGE THE USER IS. |
| PRODUCTID | IDENTIFIER OF THE PRODUCT. |
| ITEMQUANTITY | QUANTITY OF PRODUCTS IN THE ORDER. |
| PRODUCTTYPE | PRODUCT CLASSIFICATION ACCORDING TO THE E-COMMERCE |
| PAYMENTTYPENAME | FORM OF PAYMENT |
| BILLING_EMAIL | BILLING E-MAIL INFORMATION. |
| SHIPPING_EMAIL | SHIPPING E-MAIL INFORMATION. |
| BILLING_POSTALCODE | BILLING POSTAL CODE INFORMATION. |
| SHIPPING_POSTALCODE | SHIPPING POSTAL CODE INFORMATION. |
| BILLING_STREET | BILLING STREET INFORMATION. |
| SHIPPING_STREET | SHIPPING STREET INFORMATION. |
| BILLING_COUNTRY | BILLING COUNTRY INFORMATION. |
| SHIPPING_COUNTRY | SHIPPING COUNTRY INFORMATION. |
| BILLING_CITY | BILLING CITY INFORMATION. |
| SHIPPING_CITY | SHIPPING CITY INFORMATION. |
| POSTALCODE | POSTAL CODE OF THE PROFILE OF THE USER |
| EMAIL | USER'S E-MAIL. |
| PAYMENTTYPECODE | CODE OF THE FORM OF PAYMENT |
| CSH | HASH IDENTIFICATION OF THE CREDIT CARD INFORMED FOR PAYMENT. |

| ID | DESCRIPTION | SOURCE |
|---|---|---|
| 00 | HOW MANY TIMES THAT CSH WAS USED | CSH |
| 01 | HOW MANY CSH THAT IP USED | CSH |
| 02 | HOW MANY CSH THAT MCMID USED | CSH |
| 03 | HOW MANY CSH THAT PROFILE ID USED | CSH |
| 04 | HOW MANY CSH THAT USER TRIED | CSH |
| 05 | MEAN TIME BETWEEN CSH USAGE OF THE USER | CSH |
| 06 | NUMBER OF PAGES THAT THE USER REQUESTED | NAV |
| 07 | MEAN TIME BETWEEN PAGE REQUESTS | NAV |
| 08 | HOW MANY ORDERS HAVE BEEN PLACED FOR THAT PRODUCT OF THAT USER | PUR |
| 09 | HOW MANY ORDERS HAVE BEEN PLACED FOR THAT PRODUCT OF THAT IP ADDRESS | PUR |
| 10 | HOW MANY PURCHASES HAVE BEEN PLACED BY THAT MCMID | PUR |
| 11 | HOW MANY PURCHASES HAVE BEEN PLACED BY THAT PROFILE ID | PUR |
| 12 | HOW MANY PURCHASES HAVE BEEN PLACED BY THAT IP ADDRESS | PUR |
| 13 | HOW MANY PURCHASES HAVE BEEN PLACED BY THAT USER | PUR |
| 14 | HOW MANY PURCHASES HAVE BEEN PLACED WITH THAT CSH | PUR |
| 15 | MEAN TIME BETWEEN USER PURCHASES | PUR |

| CONFIDENCE LEVEL | ACCURACY | FALSE POSITIVE RATE (FPR) |
|---|---|---|
| 50% | 95.10 % | 0.2336 |
| 75% | 94.70 % | 0.2048 |
| 90% | 87.58 % | 0.0616 |
| 95% | 83.16 % | 0.0457 |

| PAGE TYPE | FRAUD PROPORTION | NORMAL PROPORTION |
|---|---|---|
| SHIPPING | 36.5% | 4.6% |
| PAYMENT | 11.4% | 3.7% |
| HOME PAGE | 9.8% | 20.7% |
| SEARCH | 2.3% | 13.5% |

| PRODUCT | FRAUDULENT PURCHASES |
|---|---|
| PRODUCT A | 35 |
| PRODUCT B | 12 |
| PRODUCT C | 1 |
| PRODUCT D | 10 |

1410

| PRODUCT | RISK |
|---|---|
| PRODUCT A | 0.8543 |
| PRODUCT B | 0.1602 |
| PRODUCT C | 0.0231 |
| PRODUCT D | 0.4507 |

1500

| ACCURACY | RECALL | SPECIFICITY | FALSE POSITIVE RATE (FPR) |
|---|---|---|---|
| 77.37% | 38.11% | 99.71% | 0.28% |

| NAVIGATION | |
|---|---|
| ID | INT |
| CREATED_AT | DATETIME |
| UPDATED_AT | DATETIME |
| MCMID | STRING |
| BROWSER_VERSION | STRING |
| COUNTRY | STRING |
| CUSTOMER_SET | STRING |
| SEGMENT | STRING |
| DGVCOLUMN1 | STRING |
| IS_BOT | BOOLEAN |
| NAVIGATION | STRING |
| REFERRER | STRING |
| URL | STRING |
| TIME | DATETIME |

FIG. 18A

| PURCHASE | |
|---|---|
| ID | INT |
| CREATED_AT | DATETIME |
| UPDATED_AT | DATETIME |
| MCMID | STRING |
| IP_ADDRESS | STRING |
| IP_COUNTRY | STRING |
| SESSION_ID | STRING |
| FORM_FACTOR | STRING |
| BROWSER | STRING |
| DEVICE | STRING |
| OS | STRING |
| LOGGED_IN | BOOLEAN |
| PROFILE_ID | STRING |
| DPID | STRING |
| COUNTRY | STRING |
| PRODUCT_ID | STRING |
| ITEM_QUANTITY | INT |
| PRODUCT_TYPE | STRING |
| PAYMENT_TYPE_NAME | STRING |
| BILLING_EMAIL | STRING |
| SHIPPING_EMAIL | STRING |
| BILLING_POSTAL_CODE | STRING |
| SHIPPING_POSTAL_CODE | STRING |
| BILLING_STREET | STRING |
| SHIPPING_STREET | STRING |
| BILLING_COUNTRY | STRING |
| SHIPPING_COUNTRY | STRING |
| BILLING_CITY | STRING |
| SHIPPING_CITY | STRING |
| POSTAL_CODE | STRING |
| EMAIL | STRING |
| PAYMENT_TYPE_CODE | STRING |
| CSH | STRING |
| TIME | DATETIME |

| CSH | |
|---|---|
| ID | INT |
| CREATED_AT | DATETIME |
| UPDATED_AT | DATETIME |
| MCMID | STRING |
| IP_ADDRESS | STRING |
| IP_COUNTRY | STRING |
| IP_CITY | STRING |
| SESSION_ID | STRING |
| PROFILE_ID | STRING |
| LOGGED_IN | BOOLEAN |
| X_FORWARDED_FOR | STRING |
| USER_AGENT | STRING |
| CSH | STRING |
| COUNTRY | STRING |
| URL | STRING |
| TIME | DATETIME |

| KEY | DESCRIPTION | SOURCE |
|---|---|---|
| %CSH_COUNTER | CSH FIELD VALUE COUNTER. | CSH |
| %IP_%CSH_MATCH_IP_CSH | COUNTER OF THE COMBINATION OF IP AND CSH. | CSH |
| %MCMID_%CSH_MATCH_MCMID_CSH | COUNTER OF THE COMBINATION OF MCMID AND CSH. | CSH |
| %PROFILEID_%CSH_MATCH_PROFILEID_CSH | COUNTER OF THE COMBINATION OF PROFILEID AND CSH. | CSH |
| %IP_%MCMID_%PROFILE_%CSH_MATCH_IP_MCMID_PROFILEID_CSH | COUNTER OF THE COMBINATION OF IP, MCMID, PROFILEID, AND CSH. | CSH |
| %MCMID_PAGES_COUNTER | COUNTER OF PAGES ACCESSED BY MCMID. | NAV |
| %PROFILEID_%PRODUCTID_PUR_COUNTER | COUNTER OF PURCHASES BY THE COMBINATION PROFILEID AND PRODUCTID. | PUR |
| %IPADDRESS_%PRODUCTID_PUR_COUNTER | COUNTER OF PURCHASES BY THE COMBINATION IPADDRESS AND PRODUCTID. | PUR |
| %MCMID_PUR_COUNTER | COUNTER OF PURCHASES BY MCMID. | PUR |
| %PROFILEID_PUR_COUNTER | COUNTER OF PURCHASES BY PROFILEID. | PUR |
| %IPADDRESS_PUR_COUNTER | COUNTER OF PURCHASES BY IPADDRESS. | PUR |
| %CSH_PUR_COUNTER | COUNTER OF PURCHASES BY CSH. | PUR |

| STEP | TIME (MILLISECONDS) |
|---|---|
| STREAMING PROCESSOR | 11.4 |
| FRAUD MANAGER | 20.2 |
| TOTAL TIME | 54.1 |

| CONTAINER | CPU(%) | MEMORY(%) |
|---|---|---|
| DATA MANAGER | 1.87% | 0.46% |
| EVENT MANAGER | 1.85% | 5.58% |
| STREAMING PROCESSOR | 5.49% | 0.16% |
| FRAUD MANAGER | 4.10% | 0.14% |
| FRAUD DETECTOR | 4.10% | 2.05% |
| RESELLER DETECTOR | 4.07% | 2.05% |
| BOT DETECTOR | 1.63% | 0.90% |

FIG. 23

MACHINE LEARNING-BASED DETECTION OF POTENTIALLY MALICIOUS BEHAVIOR ON AN E-COMMERCE PLATFORM

FIELD

The field relates generally to information processing, and more particularly to security in information processing systems.

BACKGROUND

E-commerce platforms may be used to offer a wide variety of products and services to customers. Malicious users may attempt to perform various actions on the e-commerce platforms that can disrupt operation of the e-commerce platforms. Some types of malicious users are fraudulent actors that seek to purchases products or services from an e-commerce platform with stolen payment information. Other types of malicious actors are reseller actors that seek to sell out product or service inventories from an e-commerce platform with the goal of reselling such products or services at a profit. Still other types of malicious actors represent automated bot applications.

SUMMARY

Illustrative embodiments of the present disclosure provide techniques for detecting potentially malicious behavior on an e-commerce platform utilizing machine learning.

In one embodiment, an apparatus comprises at least one processing device comprising a processor coupled to a memory. The at least one processing device is configured to perform the steps of monitoring for one or more events associated with one or more users interacting with an e-commerce platform, identifying an event type of a given one of the one or more events, the given event being associated with a given one of the one or more users interacting with the e-commerce platform, and selecting, based at least in part on the identified event type associated with the given event, at least one of a plurality of machine learning models, the plurality of machine learning models being configured to characterize different types of potentially malicious behavior on the e-commerce platform. The at least one processing device is also configured to perform the step of determining, utilizing the selected at least one of the plurality of machine learning models, whether the given user is exhibiting at least one of the different types of potentially malicious behavior on the e-commerce platform. The at least one processing device is also configured to perform the step of, responsive to determining that the given user is exhibiting the at least one of the different types of potentially malicious behavior on the e-commerce platform, initiating one or more actions on the e-commerce platform to at least one of prevent the potentially malicious behavior of the given user and mitigate an effect of the potentially malicious behavior of the given user.

These and other illustrative embodiments include, without limitation, methods, apparatus, networks, systems and processor-readable storage media.

BRIEF DESCRIPTION OF THE DRAWINGS

FIGS. 5A-5C show tables of data fields generated during credit card salted hash, navigation and purchase events on an e-commerce platform in an illustrative embodiment.

FIG. 10 shows a table of features utilized in a reseller detection machine learning model of a fraud prevention system in an illustrative embodiment.

FIG. 11 shows a table illustrating validation of a feature set utilized for a reseller detection machine learning model of a fraud prevention system in an illustrative embodiment.

FIG. 13 shows a table illustrating proportions of fraudulent and normal user behavior for different page types of an e-commerce platform in an illustrative embodiment.

FIG. 15 shows a table illustrating performance of a fraud detection machine learning model of a fraud prevention system in an illustrative embodiment.

FIGS. 18A-18C show tables illustrating a relational database schema used for navigation, purchase and credit card salted hash events from an e-commerce platform in an illustrative embodiment.

FIG. 19 shows a table illustrating keys used for parsing incoming events to generate features used by machine learning models in a fraud prevention system in an illustrative embodiment.

FIG. 22 shows a table illustrating time spent by different microservices of a fraud prevention system in an illustrative embodiment.

FIG. 23 shows a table illustrating resource consumption by different microservices of a fraud prevention system in an illustrative embodiment.

DETAILED DESCRIPTION

Illustrative embodiments will be described herein with reference to exemplary information processing systems and associated computers, servers, storage devices and other processing devices. It is to be appreciated, however, that embodiments are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other type of cloud-based system that includes one or more clouds hosting tenants that access cloud resources.

Figure 1:
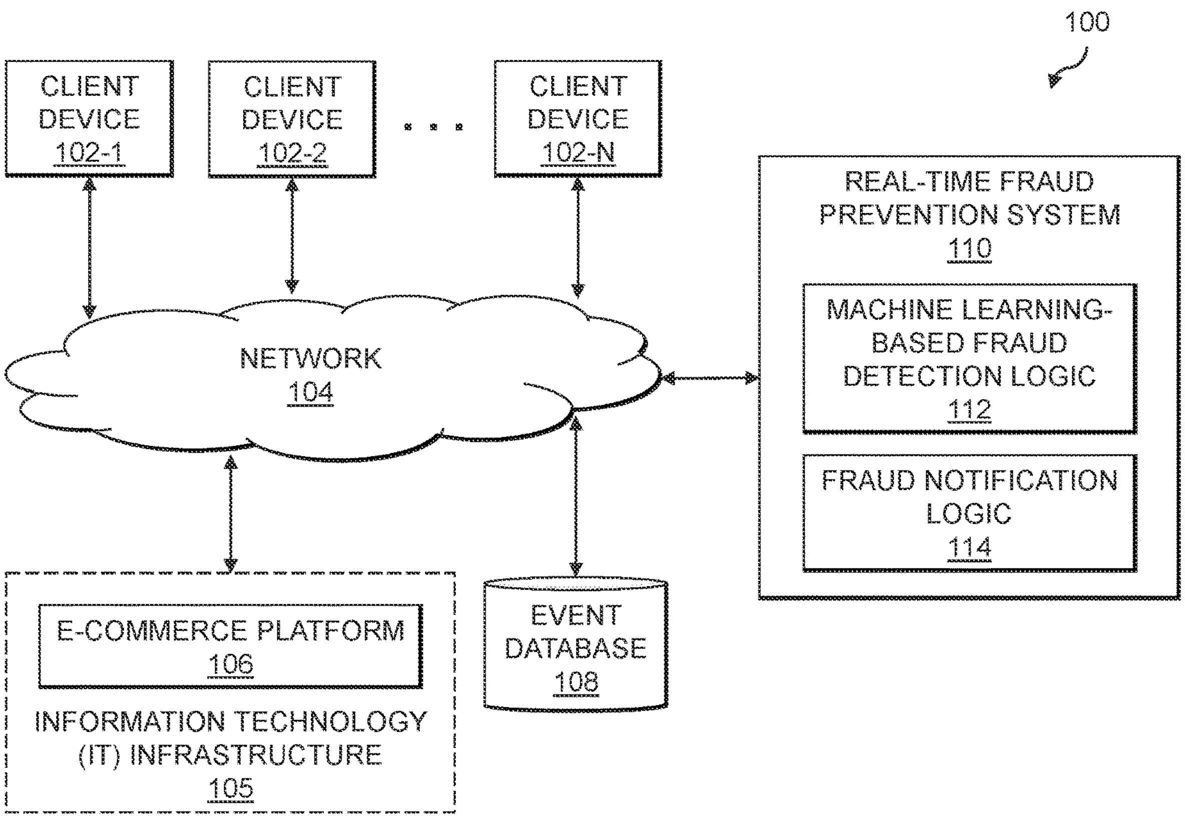
FIG. 1 is a block diagram of an information processing system configured for detecting potentially malicious behavior on an e-commerce platform utilizing machine learning in an illustrative embodiment.

FIG. 1 shows an information processing system 100 configured in accordance with an illustrative embodiment. The information processing system 100 is assumed to be built on at least one processing platform and provides functionality for detecting potentially malicious behavior on an e-commerce platform 106 utilizing machine learning. The information processing system 100 includes a set of client devices 102-1, 102-2, . . . 102-N (collectively, client devices 102) which are coupled to a network 104 used to access the e-commerce platform 106 that runs on information technology infrastructure 105. The e-commerce platform 106 may comprise, for example, a website or application that is accessed by users of the client devices 102 for purchasing products. The e-commerce platform 106 may run on various IT assets of the IT infrastructure 105, where the IT assets may include physical and virtual computing resources. Also coupled to the network 104 is an event database 108 and a real-time fraud prevention system 110.

The real-time fraud prevention system 110 is configured to analyze behavior of users (e.g., of the client devices 102) of the e-commerce platform 106, to detect possibly fraudulent or malicious user behavior. To do so, the real-time fraud prevention system 110 implements machine learning-based fraud detection logic 112. The machine learning-based fraud detection logic 112 analyzes events from the event database 108, where the events characterize user behavior as users of the client devices 102 navigate a website or other interface of the e-commerce platform 106. When possibly fraudulent or malicious user behavior is detected via the machine learning-based fraud detection logic 112, the real-time fraud prevention system 110 utilizes the fraud notification logic 114 to inform the e-commerce platform 106 of such behavior and to initiate actions to prevent or mitigate such behavior.

The client devices 102 may comprise, for example, physical computing devices such as mobile telephones, laptop computers, tablet computers, desktop computers, Internet of Things (IoT) devices, or other types of devices. Such devices are examples of what are more generally referred to herein as "processing devices." Some of these processing devices are also generally referred to herein as "computers." The client devices 102 in some cases may also or alternatively comprise virtualized computing resources, such as virtual machines (VMs), software containers, etc.

The client devices 102 may in some embodiments comprise respective computers associated with different companies, entities, enterprises or other organizations. In addition, at least portions of the system 100 may also be referred to herein as collectively comprising one or more "enterprises." Numerous other operating scenarios involving a wide variety of different types and arrangements of processing nodes are possible, as will be appreciated by those skilled in the art.

The network 104 is assumed to comprise a global computer network such as the Internet, although other types of networks can be used, including a wide area network (WAN), a local area network (LAN), a satellite network, a telephone or cable network, a cellular network, a wireless network such as a WiFi or WiMAX network, or various portions or combinations of these and other types of networks.

The e-commerce platform 106 running on IT assets of the IT infrastructure 105 may be associated with or operated by one or more enterprises or other organizations. The e-commerce platform 106 and the IT infrastructure 105 on which the e-commerce platform 106 runs may therefore be referred to as an enterprise system. As used herein, the term "enterprise system" is intended to be construed broadly to include any group of systems or other computing devices. In some embodiments, an enterprise system includes cloud infrastructure comprising one or more clouds (e.g., one or more public clouds, one or more private clouds, one or more hybrid clouds, combinations thereof, etc.). The cloud infrastructure may also host at least a portion of the client devices 102. A given enterprise system may host assets that are associated with multiple enterprises (e.g., two or more different businesses, entities or other organizations). For example, in some cases the IT infrastructure 105 may host multiple different e-commerce platforms associated with different enterprises (e.g., different vendors) which offer their products and services to users of the client devices 102. Each of such multiple e-commerce platforms may utilize the real-time fraud prevention system 110 (or another instance thereof) for analyzing user behavior on that platform to detect and prevent fraudulent and other potentially malicious actibity (e.g., reseller activity, automated bot activity, etc.). The event database 108 and/or the real-time fraud prevention system 110, although shown in FIG. 1 as being implemented external to the IT infrastructure 105, may in other embodiments be at least partially implemented using IT assets of the IT infrastructure 105.

The event database 108, as discussed above, is configured to store and record various information that is used by the real-time fraud prevention system 110 in detecting whether user behavior on the e-commerce platform 106 is fraudulent or potentially malicious. Such data may include events, which characterize how the users navigate among pages or other parts of the website or other interface of the e-commerce platform 106. The events may also or alternatively characterize submission of payment information (e.g., credit card information) to the e-commerce platform 106. The event database 108 in some embodiments is implemented using one or more storage systems or devices associated with the real-time fraud prevention system 110. In some embodiments, one or more of the storage systems utilized to implement the event database 108 comprises a scale-out all-flash content addressable storage array or other type of storage array.

The term "storage system" as used herein is therefore intended to be broadly construed, and should not be viewed as being limited to content addressable storage systems or flash-based storage systems. A given storage system as the term is broadly used herein can comprise, for example, network-attached storage (NAS), storage area networks (SANs), direct-attached storage (DAS) and distributed DAS, as well as combinations of these and other storage types, including software-defined storage.

Other particular types of storage products that can be used in implementing storage systems in illustrative embodiments include all-flash and hybrid flash storage arrays, software-defined storage products, cloud storage products, object-based storage products, and scale-out NAS clusters. Combinations of multiple ones of these and other storage products can also be used in implementing a given storage system in an illustrative embodiment.

Although not explicitly shown in FIG. 1, one or more input-output devices such as keyboards, displays or other types of input-output devices may be used to support one or more user interfaces to the client devices 102, the e-commerce platform 106, the event database 108 and the real-time fraud prevention system 110, as well as to support communication therebetween and with other related systems and devices not explicitly shown.

Although shown in the FIG. 1 embodiment as being separate from the client devices 102 and the e-commerce platform 106 (e.g., as a stand-alone server, set of servers or other type of system coupled via the network 104 to the client devices 102 and the e-commerce platform 106), the real-time fraud prevention system 110 or at least portions thereof (e.g., one or more of the machine learning-based fraud detection logic 112 and the fraud notification logic 114) may in other embodiments be implemented at least in part internally to one or more of the client devices 102 and/or the e-commerce platform 106. In some embodiments, the real-time fraud prevention system 110 is implemented as a service that the e-commerce platform 106 (and potentially other distinct e-commerce platforms) and/or the client devices 102 subscribe to.

The client devices 102, the e-commerce platform 106, the event database 108 and the real-time fraud prevention system 110 in the FIG. 1 embodiment are assumed to be implemented using at least one processing device. Each such processing device generally comprises at least one processor and an associated memory, and implements at least a portion of the functionality of such elements, such as one or more of the machine learning-based fraud detection logic 112 and fraud notification logic 114 of the real-time fraud prevention system 110.

It is to be appreciated that the particular arrangement of the client devices 102, the e-commerce platform 106, the event database 108 and the real-time fraud prevention system 110 illustrated in the FIG. 1 embodiment is presented by way of example only, and alternative arrangements can be used in other embodiments. As discussed above, for example, the real-time fraud prevention system 110 may in some cases be implemented at least in part internal to one or more of the client devices 102 and/or the e-commerce platform 106. At least portions of the machine learning-based fraud detection logic 112 and the fraud notification logic 114 may be implemented at least in part in the form of software that is stored in memory and executed by a processor.

It is to be understood that the particular set of elements shown in FIG. 1 for detecting potentially malicious behavior on the e-commerce platform 106 utilizing machine learning is presented by way of illustrative example only, and in other embodiments additional or alternative elements may be used. Thus, another embodiment may include additional or alternative systems, devices and other network entities, as well as different arrangements of modules, logic and other components.

The client devices 102, the e-commerce platform 106, the event database 108, the real-time fraud prevention system 110 and other portions of the system 100, as will be described above and in further detail below, may be part of cloud infrastructure.

The client devices 102, the e-commerce platform 106, the event database 108, the real-time fraud prevention system 110, and other components of the information processing system 100 in the FIG. 1 embodiment are assumed to be implemented using at least one processing platform comprising one or more processing devices each having a processor coupled to a memory. Such processing devices can illustratively include particular arrangements of compute, storage and network resources.

The client devices 102, the e-commerce platform 106, the event database 108 and the real-time fraud prevention system 110, or components thereof, may be implemented on respective distinct processing platforms, although numerous other arrangements are possible. For example, in some embodiments at least portions of the client devices 102, the e-commerce platform 106, the event database 108, and the real-time fraud prevention system 110, or components thereof, are implemented on the same processing platform.

The term "processing platform" as used herein is intended to be broadly construed so as to encompass, by way of illustration and without limitation, multiple sets of processing devices and associated storage systems that are configured to communicate over one or more networks. For example, distributed implementations of the system 100 are possible, in which certain components of the system reside in one data center in a first geographic location while other components of the system reside in one or more other data centers in one or more other geographic locations that are potentially remote from the first geographic location. Thus, it is possible in some implementations of the system 100 for the client devices 102, the e-commerce platform 106, the event database 108, and the real-time fraud prevention system 110, or portions or components thereof, to reside in different data centers. Numerous other distributed implementations are possible.

Additional examples of processing platforms utilized to implement the client devices 102, the e-commerce platform 106, the event database 108, the real-time fraud prevention system 110, and other components of the system 100 in illustrative embodiments will be described in more detail below in conjunction with FIGS. 24 and 25.

It is to be appreciated that these and other features of illustrative embodiments are presented by way of example only, and should not be construed as limiting in any way.

An exemplary process for detecting potentially malicious behavior on an e-commerce platform utilizing machine learning will now be described in more detail with reference to the flow diagram of FIG. 2. It is to be understood that this particular process is only an example, and that additional or alternative processes for detecting potentially malicious behavior on an e-commerce platform utilizing machine learning may be used in other embodiments.

In this embodiment, the process includes steps 200 through 208. These steps are assumed to be performed by the real-time fraud prevention system 110 utilizing the machine learning-based fraud detection logic 112 and the fraud notification logic 114. The process begins with step 200, monitoring for one or more events associated with one or more users interacting with an e-commerce platform (e.g., e-commerce platform 106). Step 200 may comprise parsing the one or more events to: (1) update an in-memory database of a plurality of features, wherein different subsets of the plurality of features are utilized by different ones of the plurality of machine learning models; and (2) update an event database with event information for the one or more events.

In step 202, an event type of a given one of the one or more events is identified. The given event is associated with a given one of the one or more users interacting with the e-commerce platform. Step 202 may comprise determining whether the given event is one of: a navigation event whereby the given user moves between two or more pages of an interface of the e-commerce platform; a purchase event whereby the given user purchases one or more products or services from the e-commerce platform; a payment event whereby the given user submits payment information to the e-commerce platform. The payment event may comprise a credit card salted hash event generated when the given user submits credit card information as a payment method for one or more purchase orders on the e-commerce platform.

At least one of a plurality of machine learning models is selected in step 204 based at least in part on the identified event type associated with the given event. The plurality of machine learning models are configured to characterize different types of potentially malicious behavior on the e-commerce platform. In step 206, a determination is made as to whether the given user is exhibiting at least one of the different types of potentially malicious behavior on the e-commerce platform utilizing the selected at least one of the plurality of machine learning models. The plurality of different machine learning models may comprise a fraud detection machine learning model, a reseller detection machine learning model, and a bot detection machine learning model. The selected at least one of the plurality of machine learning models may comprise the bot detection machine learning model responsive to the identified event type of the given event being a navigation event whereby the given user moves between two or more pages of an interface of the e-commerce platform. The selected at least one of the plurality of machine learning models may comprise the fraud detection machine learning model and the reseller detection machine learning model responsive to the identified event type of the given event being a payment event whereby the given user submits payment information to the e-commerce platform.

The fraud detection machine learning model and the reseller detection machine learning model may comprise respective Multi-Layer Perceptron (MLP) Artificial Neural Network (ANN) machine learning models. The bot detection machine learning model may comprises a Long-Short Term Memory (LSTM) Recurrent Neural Network (RNN) machine learning model.

The fraud detection machine learning model may be trained with a set of historical events recognized as fraudulent activity. The fraud detection machine learning model is configured to use a plurality of features computed based on the given event and one or more additional payment events having the same submitted payment information as the given event. An output of the fraud detection machine learning model is combined with an analysis of a navigation pattern of the given user on the interface of the e-commerce platform and a purchase history analysis of the given user on the interface of the e-commerce platform to characterize whether the given user is exhibiting fraudulent behavior on the e-commerce platform.

The reseller detection machine learning model may be trained with a set of historical events recognized as reseller activity. The reseller detection machine learning model uses a plurality of features computed based on the given event and one or more additional payment events having the same submitted payment information as the given event. An output of the reseller detection machine learning model characterizes whether the given user is exhibiting reseller behavior on the e-commerce platform.

The bot detection machine learning model may use the given event and the one or more additional events associated with the given user to generate a set of features characterizing a navigation pattern of the given user on the interface of the e-commerce platform. An output of the bot detection machine learning model characterizes whether the given user is exhibiting automated bot behavior on the e-commerce platform.

Figure 2:
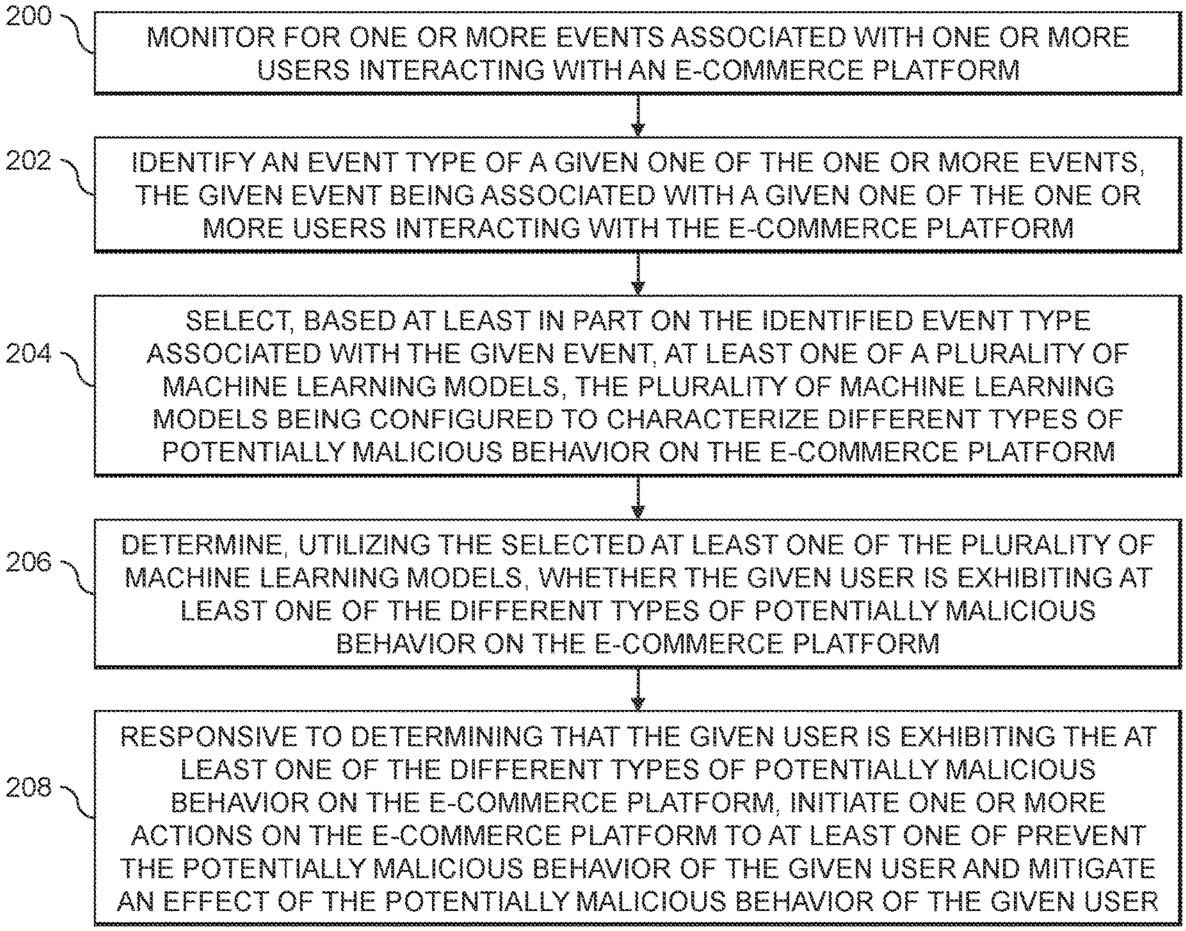
FIG. 2 is a flow diagram of an exemplary process for detecting potentially malicious behavior on an e-commerce platform utilizing machine learning in an illustrative embodiment.

The FIG. 2 process continues with step 208, initiating one or more actions on the e-commerce platform to at least one of prevent the potentially malicious behavior of the given user and mitigate an effect of the potentially malicious behavior of the given user responsive to determining that the given user is exhibiting the at least one of the different types of potentially malicious behavior on the e-commerce platform. The one or more actions initiated on the e-commerce platform may comprise at least one action that prevents the given user from completing one or more purchases on the e-commerce platform. The one or more actions initiated on the e-commerce platform may alternatively comprise at least one action for implementing additional security analysis prior to permitting the given user to complete one or more purchases on the e-commerce platform.

Illustrative embodiments provide technical solutions for fraud prevention (e.g., credit card fraud prevention) in e-commerce platforms, such as e-commerce platform 106. Conventional approaches suffer from various technical problems, including different types of fraudulent actions by malicious actors. Such fraudulent actions include, but are not limited to, attempting to purchase products using stolen credit cards, bot activity and reseller abuse (e.g., in which a malicious actor purchases all available inventory for a specific product from one platform and then resells that product at an inflated price on some other platform), etc. These fraudulent actions impact customer experience, such that legitimate actors (e.g., non-fraudulent actors) are not able to purchase products. In this context, the technical solutions described herein monitor user activity in real-time on an e-commerce platform (e.g., e-commerce platform 106), in order to classify user activity before purchase orders are placed. In this way, the e-commerce platform provides improved services through avoiding or preventing fraudulent actions (e.g., which can lead to loss of revenue, negative customer experience, damage to brand reputation, etc.).

The technical solutions described herein provide fraud prevention systems (e.g., the real-time fraud prevention system 110) configured to detect different types of fraudulent or malicious actors on e-commerce platforms (e.g., e-commerce platform 106) in real-time or near real-time. The technical solutions described herein thus provide various technical advantages for end-user reliability and security. Further, the technical solutions described herein can tackle the technical problems of supply shortages, which can be seen in different sales branches. With this approach, the technical solutions described herein improve the availability of desired products on an e-commerce platform (e.g., a vendor website) and the official prices designed for such products. Additional technical advantages in some embodiments include the mitigation of risks from the viewpoint of an operator of an e-commerce platform, since the technical solutions described herein can avoid or reduce purchases made by malicious actors (e.g., bots, resellers, users with stolen credit cards, etc.). The fraud prevention systems described herein can produce the desired detection in real-time or near real-time (e.g., in milliseconds to seconds) to stop or deter fraudulent transactions. The fraud prevention systems provide further advantages using an architecture that can scale rapidly to strike an optimal or desired balance between accuracy and false positivity rate for fraud detection.

Customers may buy a wide variety of products from an e-commerce platform (e.g., via a website, mobile application, or other interface). E-commerce platforms, however, constantly suffer from the attempts of fraudulent or malicious actors. Some malicious actors seek to purchase products using stolen data from other people (e.g., stolen credit card information). Other malicious actors such as bots and resellers seek to sell out the stock of specific products, with the goal of reselling them to final customers at higher prices and making personal profit. The fraud prevention systems described herein provide technical solutions for detecting these and other activities to prevent them from happening. The fraud prevention systems monitor data from e-commerce platforms in real-time, analyzing customer activity to classify them as fraudsters, resellers, or automated bots. The technical solutions described can advantageously provide a classification output before a purchase process finishes so that the e-commerce platform can prevent the fraudulent actions from happening.

Figure 3:
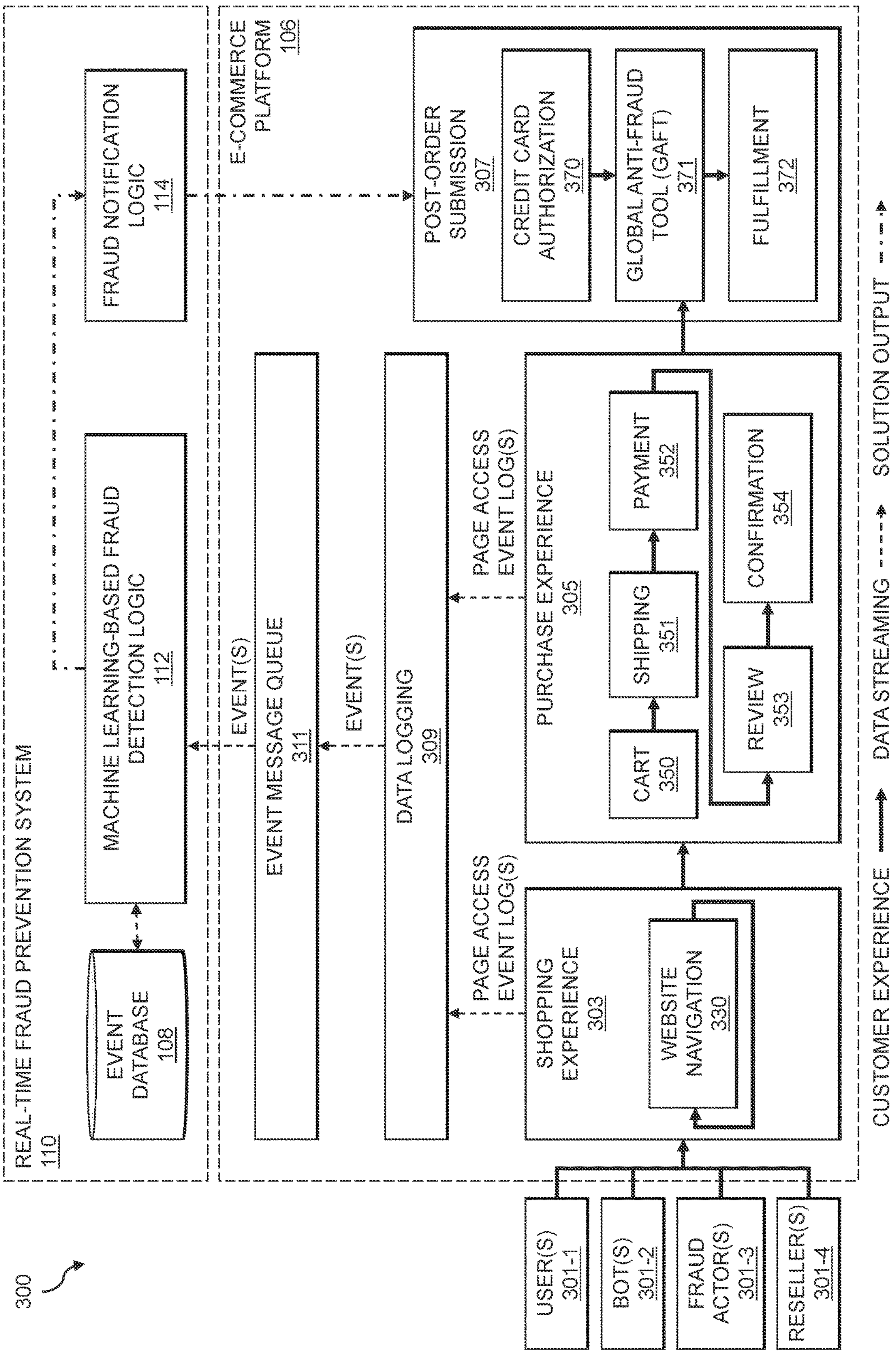
FIG. 3 shows a fraud prevention system interacting with an e-commerce platform in an illustrative embodiment.

FIG. 3 shows a system overview 300, which includes the real-time fraud prevention system 110 configured to operate in parallel with the e-commerce platform 106. The e-commerce platform 106 includes various elements that track the events of users (e.g., of client devices 102, not shown) as they browse a web site or other interface to navigate through the e-commerce platform 106. The users shown in FIG. 3 include non-fraudulent or "normal" users 301-1 and various categories of fraudulent or "malicious" actors, including bots 301-2, fraud actors 301-3 and resellers 301-4. The users 301-1, bots 301-2, fraud actors 301-3 and resellers 301-4 are collectively referred to as customers 301. The customers 301 utilize a shopping experience 303 of the e-commerce platform 106, which includes website or other interface navigation 330 (e.g., which the customers 301 use to browse different products made available on the e-commerce platform 106).

The website or other interface navigation 330 will eventually bring the customers 301 to a purchase experience 305 of the e-commerce platform 106, which may include different pages or interfaces for completing purchase orders, including a cart page 350 (e.g., showing products that the customers 301 have selected for purchase), a shipping page 351 (e.g., for entering shipping details where the selected products are to be sent), a payment page 352 (e.g., for entering payment information, such as credit card information and billing address information), a review page 353 (e.g., for enabling the customers 301 to confirm the selected products as well as the entered shipping and payment information), and a confirmation page 354 (e.g., for informing the customers 301 whether a purchase order has been successfully placed). The e-commerce platform 106 also includes post-order submission 307 functionality, such as credit card or other payment information authorization 370, application of a global anti-fraud tool (GAFT) 371, and purchase order fulfillment 372.

As the customers 301 navigate through the shopping experience 303 and purchase experience 305 of the e-commerce platform 106, page access event logs are provided to a data logging tool 309. The data logging tool 309 can analyze the page access event logs in order to detect "events" that are passed to an event message queue 311. The event message queue 311 passes the detected events to the real-time fraud prevention system 110, which applies the machine learning-based fraud detection logic 112 using the received events (e.g., which may be stored in the event database 108) to detect and classify the customers 301 (e.g., as normal or non-malicious users 301-1, bots 301-2, fraud actors 301-3 or resellers 301-4). Such classifications are used by the fraud notification logic 114 of the real-time fraud prevention system 110. The fraud notification logic 114 can provide notifications to the post-order submission 307 functionality of the e-commerce platform 106 when particular purchase orders are determined (e.g., with some threshold confidence level) to be associated with customers 301 who are bots 301-2, fraud actors 301-3 or resellers 301-4. Such notifications may trigger various remedial action (e.g., requiring additional or more intensive credit card authorization 370 processes, running the GAFT 371, preventing fulfillment 372, etc.).

The machine learning-based fraud detection logic 112 of the real-time fraud prevention system 110 analyzes the events provided by the event message queue 311 in real-time by processing such event information with machine learning models to generate the classifications of the customers 301. In some embodiments, such classifications are generated before the customers 301 even finish the purchase process in the purchase experience 305. The classifications of the customers 301 may also be generated and dynamically updated as the customers 301 navigate through the shopping experience 303 and the purchase experience 305.

During the purchase process on the e-commerce platform 106, several different customers 301 may be browsing the website or other interface of the e-commerce platform 106. The customers 301, as noted above, may include malicious actors such as bots 301-2 (e.g., autonomous programs), fraud actors 301-3 and resellers 301-4. The technical solutions described herein provide a scalable architecture for detecting and preventing fraud on the e-commerce platform 106. Conventional approaches lack fully integrated solutions for detecting and preventing different types of fraud (e.g., credit card fraud, bots, malicious resellers, etc.). Some conventional approaches, for example, focus only on detection of credit card fraud while not addressing reseller abuse or automated bot activity. Further, conventional approaches only detect fraud after it has already taken place in an e-commerce platform. E-commerce platforms thus suffer from constant attempts by malicious actors (e.g., fraudsters, resellers, bots) that can cause loss of revenue and depletion of product inventory. Such fraudulent activity can cause genuine customers to miss out on the opportunity to buy products on an e-commerce platform, and can harm brand reputation (e.g., leading to negative customer sentiment's for the brand of the operator of the e-commerce platform).

The technical solutions described herein provide an architecture for addressing fraud prevention and detection. The architecture in some embodiments includes a computational model in which different microservices or modules communicate with each other to provide fraud, reseller and bot detection in real-time or near real-time. The architecture in some embodiments also includes databases, a cache engine, a filtering mechanism, and the definition of internal and external application programming interfaces (APIs). The architecture is advantageously scalable and non-intrusive, requiring minimal or no modification to existing e-commerce platforms to enable them to utilize the solutions described herein.

The real-time fraud prevention system 110 in some embodiments is configured to detect fraudulent activity as the customers 301 navigate the website or other interface of the e-commerce platform 106 (e.g., website or other interface navigation 330 during the shopping experience 303, the various pages 350 through 354 of the purchase experience 305, etc.). Insights from data analysis, data prediction and scalability approaches are used to design the real-time fraud prevention system 110 which is configured to operate in real-time or near real-time to detect various types of fraudulent activity. The real-time fraud prevention system 110, via the machine learning-based fraud detection logic 112, employs machine learning computational modules to classify the customers 301 (e.g., their associated probabilities of being normal or non-malicious users 301-1, bots 301-2, fraud actors 301-3 and resellers 301-4). The technical solutions described herein provide various advantages, including: through the use of a scalable system architecture that supports replication of the different machine learning and other computational modules to balance load; through the use of a system that is agnostic to technologies, such that the computational modules can work apart from the technologies (e.g., the specific physical and/or virtual computing resources) used to implement the real-time fraud prevention system 110; through enabling real-time processing which aims at processing streaming data to generate output (e.g., classifications of the customers 301) as quickly as possible; through enabling the real-time fraud prevention system 110 to run apart from the e-commerce platform 106 such that no or minimal modifications to the website or interface of the e-commerce platform 106 are needed; and the ability to process data asynchronously to generate notifications using the fraud notification logic 114 in a publish/subscribe fashion which is able to run in parallel with the e-commerce platform 106 to generate notifications in a messaging queue that the e-commerce platform 106 can consume to prevent fraudulent activity.

In some embodiments, the real-time fraud prevention system 110 utilizes a set of microservices for performing different tasks such as data acquisition, data processing and data prediction. Monolithic applications may suffer from disadvantages relating to innovation, manageability, resiliency and scalability, particularly in computing environments such as cloud computing environments, datacenters, and converged infrastructure. As an alternative to such monolithic applications, some software architectures provide different functions in the form of microservices. In a microservice architecture, a single application (e.g., such as the real-time fraud prevention system 110) is developed as a suite of small microservices. A microservice can run on its own process and communicate with other systems or services through a lightweight mechanism, such as a hypertext transport protocol (HTTP) resource API or communication API provided by an external system. Microservices in some embodiments are assumed to be independently deployable using fully automated deployment mechanisms.

In some embodiments, microservices are small, independent and composable services that can be accessed through Representational State Transfer (RESTful) APIs. Thus, a single monolithic application such as the real-time fraud prevention system 110 may be broken down into separate and independent microservices for discrete functions, providing potential benefits in innovation, manageability, resiliency and scalability. Innovation benefits may be provided through the ability to develop and deploy new versions of microservices more rapidly as compared to a single monolithic application. Manageability benefits may be realized as the code used is smaller and thus easier to understand, facilitating changes and deployments. Resiliency benefits may be realized as functionality may be distributed across multiple microservices, such that failure or downtime of one microservice does not result in loss of functionality provided by other microservices. Scalability benefits may be realized in that microservices can be deployed and scaled independently of one another.

Microservices-based software architectural design structures an application as a collection of loosely coupled services. Microservices-based software architectures may be viewed as a variant of a service-oriented architecture that focuses on fine-grained services, lightweight protocols, etc. A microservices architecture enables individual microservices to be deployed and scaled independently, such as via software containers. Individual microservices can be worked on in parallel by different teams, may be built in different programming languages, and have continuous delivery and deployment flows. As development moves toward cloud-native approaches, it is desired to decompose, disintegrate or otherwise separate existing monolithic applications into microservices. Advantageously, microservices allow software developers of an enterprise to work independently and communicate together. Thus, an enterprise system can achieve better efficiency and resiliency with microservices as compared with monolithic applications, while providing similar or better results.

The real-time fraud prevention system 110 can integrate with an existing e-commerce platform 106 (e.g., providing the shopping experience 303, purchase experience 305 and post-order submission 307 functionality) through an event middleware (e.g., data logging tool 309 and event message queue 311). When customers 301 browse the e-commerce platform 106 and navigate through the purchase process, their web browsers can send two types of HTTP requests to web servers of the e-commerce platform 106: HTTP GET requests, where the web browsers of the customers 301 request data from the web servers of the e-commerce platform 106; and HTTP POST requests, when the web browsers of the customers 301 send data to the web servers of the e-commerce platform 106. The e-commerce platform 106 logs such HTTP GET and HTTP POST requests jointly with information regarding the customers 301 and the page(s) requested, which are provided as the page access event logs from the shopping experience 303 and purchase experience 305 to the data logging tool 309.

The event middleware includes the data logging tool 309 and event message queue 311, which processes the page access event logs and transforms them into events that can be consumed by other applications. Although in FIG. 3 the event middleware is shown as being part of the e-commerce platform 106, this is not a requirement. The event middleware may be implemented at least in part internal to the real-time fraud prevention system 110, or at least in part external to both the e-commerce platform 106 and the real-time fraud prevention system 110. In some embodiments, the event message queue 311 provides a publish/subscribe system that forwards each event (e.g., as soon as they are generated) to the real-time fraud prevention system 110. The publish/subscribe system provided via the event message queue 311 can advantageously consume the events in real-time or near real-time. The real-time fraud prevention system 110 is configured, via the machine learning-based fraud detection logic 112, to process each event and transform it into several features to be used in the machine learning models. A management computation module (e.g., a fraud manager) orchestrates the machine learning models by calling associated machine learning computation modules to perform predictions or classifications of the customers 301 as they browse the e-commerce platform 106 and navigate through the shopping experience 303 and the purchase experience 305. Once the machine learning computational modules produce their classification results, the fraud manager sends a notification to an additional publish/subscribe system implemented using the fraud notification logic 114, which can be used by other applications in the post-order submission functionality 307 of the e-commerce platform 106 (e.g., credit card authorization 370, GAFT 371, fulfillment 372) to take actions according to the generated notifications.

Figure 4:
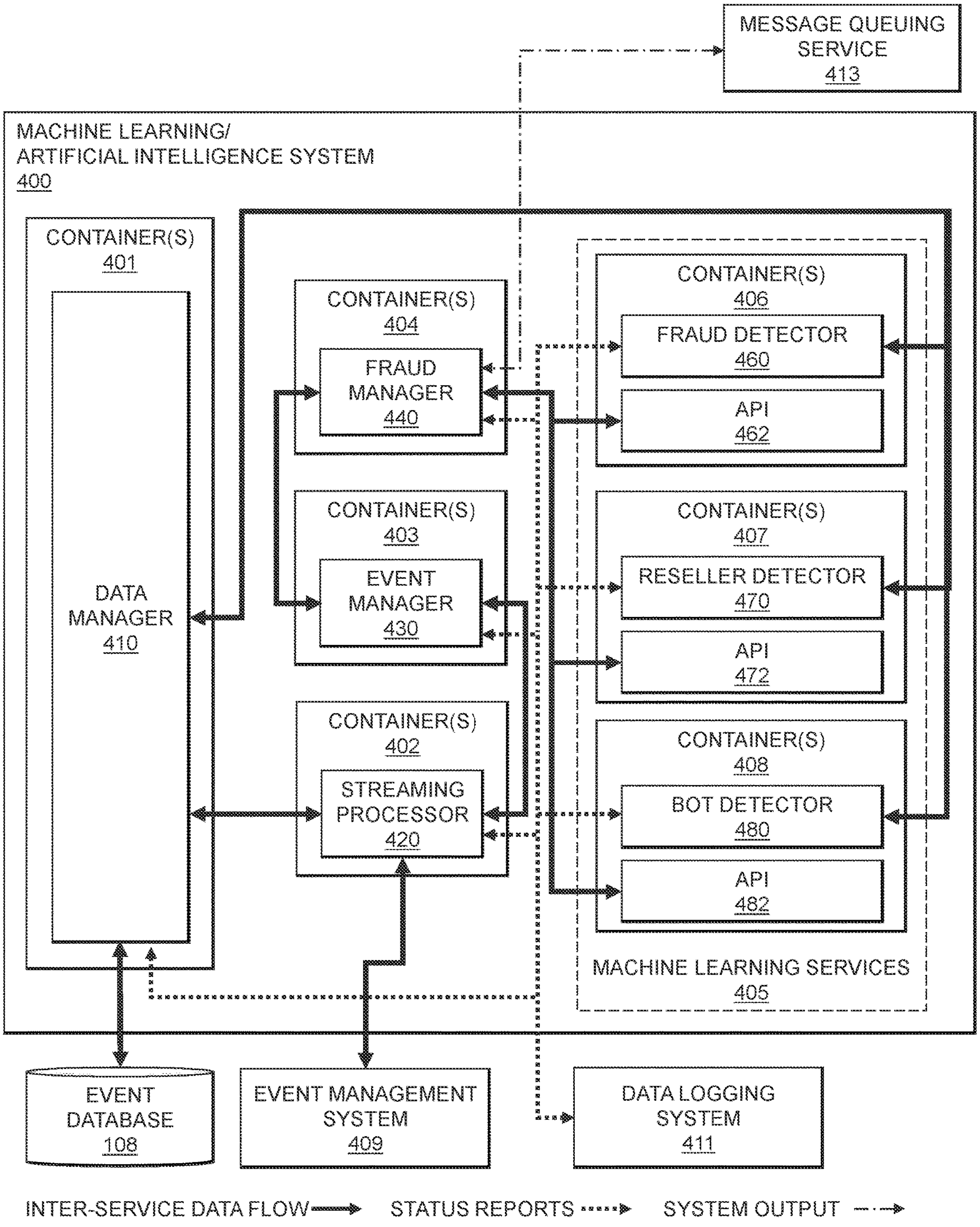
FIG. 4 shows a microservices architecture for a fraud prevention system in an illustrative embodiment.

An example implementation of the above-described architecture of the real-time fraud prevention system 110 will now be described. FIG. 4 shows a machine learning (ML)/artificial intelligence (AI) system 400, which includes various microservices running in software containers 401, 402, 403, 404, 406, 407 and 408 that provide various portions of the functionality of the machine learning-based fraud detection logic 112. The software containers 401 implement a data manager microservice 410 (also referred to simply as a data manager 410), the software containers 402 implement a streaming processor microservice 420 (also referred to simply as a streaming processor 420), the software containers 403 implement an event manager microservice 430 (also referred to simply as an event manager 430), and the software containers 404 implement a fraud manager microservice 440 (also referred to simply as a fraud manager 440). The ML/AI system 400 also provides machine learning services 405 that run in the software containers 406, 407 and 408. The software containers 406 implement a fraud detector microservice 460 (also referred to simply as a fraud detector 460) and an associated API 462, the software containers 407 implement a reseller detector microservice 470 (also referred to simply as a reseller detector 470) and an associated API 472, and the software containers 408 implement a bot detector microservice 480 (also referred to simply as a bot detector 480) and an associated API 482.

The data manager 410 interacts with the event database 108. The streaming processor 420 interacts with an event management system 409 (e.g., which may be part of event middleware of the e-commerce platform 106, such as the event message queue 311). The data manager 410, the streaming processor 420, event manager 430, fraud manager 440, fraud detector 460, reseller detector 470 and bot detector 480 interact with a data logging system 411 (e.g., which may be part of event middleware of the e-commerce platform 106, such as the data logging tool 309). The fraud manager 440 interacts with a message queuing service 413 providing at least a portion of the functionality of the fraud notification logic 114. Although in FIG. 4 the event management system 409, the data logging system 411, the message queuing service 413 and the event database 108 are shown as being implemented external to the ML/AI system 400, in other embodiments one or more of the event management system 409, the data logging system 411, the message queuing service 413 and the event database 108 may be implemented at least in part internally to the ML/AI system 400. In FIG. 4, different interconnection lines are used to represent data flow among the various microservices, log information exported to the data logging system 411, and output from the fraud manager 440 to the message queuing service 413.

The data manager 410 manages database operations with the event database 108, and provides data storage and access functionality for other ones of the microservices in the ML/AI system 400. The streaming processor 420 acquires data from external sources providing the system input (e.g., the event management system 409). The event manager 430 can process or detect events in the acquired data and provide detected events and/or features extracted therefrom to other ones of the microservices. The fraud manager 440 orchestrates the execution of the machine learning services 405 (e.g., the fraud detector 460, the reseller detector 470, and the bot detector 480) and generates notifications regarding possible fraudulent activity (e.g., credit card or other payment fraud, malicious reseller activity, automated bot activity) which are provided to the message queuing service 413. The fraud detector 460 executes a machine learning model that predicts the probability of a given customer being a fraud actor (e.g., a user that is conducting credit card or other payment fraud). The reseller detector 470 executes a machine learning model to predict the probability of a given customer being a reseller. The bot detector 480 executes a machine learning model to predict the probability of a given customer being an automated bot.

The ML/AI system 400 consumes events from the e-commerce platform 106 (e.g., from an event management system 409 associated with the e-commerce platform 106). In some embodiments, the events are consumed in a publish/subscribe fashion. The e-commerce platform 106 is assumed to track customer behavior and generate events in a message queue which are received at the ML/AI system 400 via the event management system 409. The events can be classified into different types according to their source, such as: credit card salted hash (CSH), navigation (NAV) and purchase (PUR). CSH events are generated every time a user submits credit card information as a payment method for a purchase order on the e-commerce platform 106. NAV events are generated every time a user requests a web page from the e-commerce platform 106. PUR events are generated when a user places a purchase order on the e-commerce platform 106.

The process of purchasing a product on the e-commerce platform 106 may be composed of several steps that the user performs. Referring back to FIG. 3, such steps may include website or other interface navigation 330 during the shopping experience 303 as well as accessing different ones of the pages 350 through 354 during the purchase experience 305. At each new page request, the e-commerce platform 106 generates a NAV event which contains various fields as shown in the table 500 of FIG. 5A. To start the process of purchasing a product, after the product is added to the "cart" the user provides a payment method. When opting for credit card payment, the user accesses a specific page to provide the credit card information and then submits it for validation. Each time data is submitted on this page, the e-commerce platform 106 generates a CSH event which contains various fields as shown in the table 505 of FIG. 5B. When the user finishes the purchasing process by submitting the order, the e-commerce platform 106 generates a PUR event which contains various fields as shown in the table 510 of FIG. 5C.

Figure 6A:
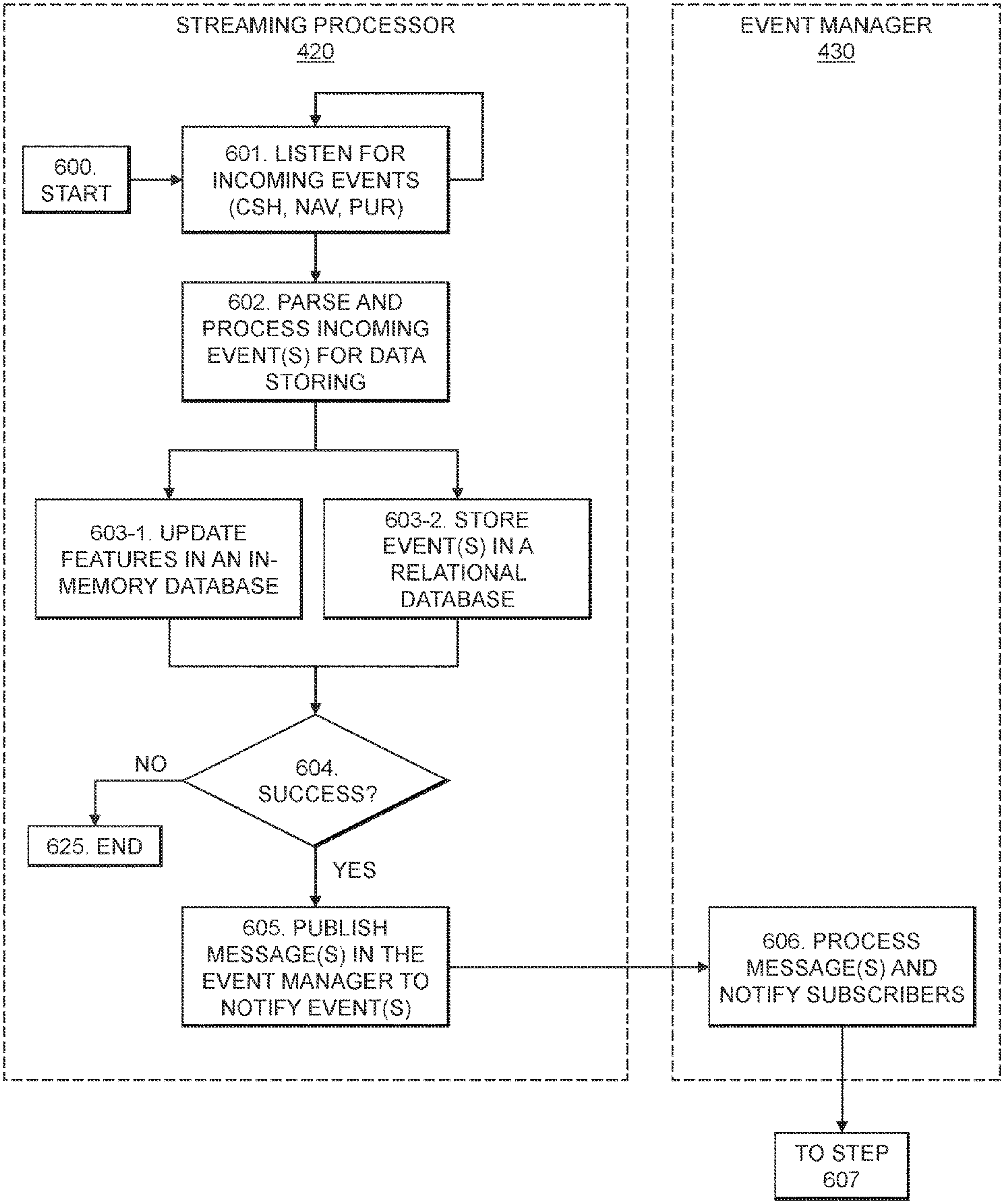
FIGS. 6A-6C show an execution flow for different microservices of a fraud prevention system in an illustrative embodiment.
Figure 6B:
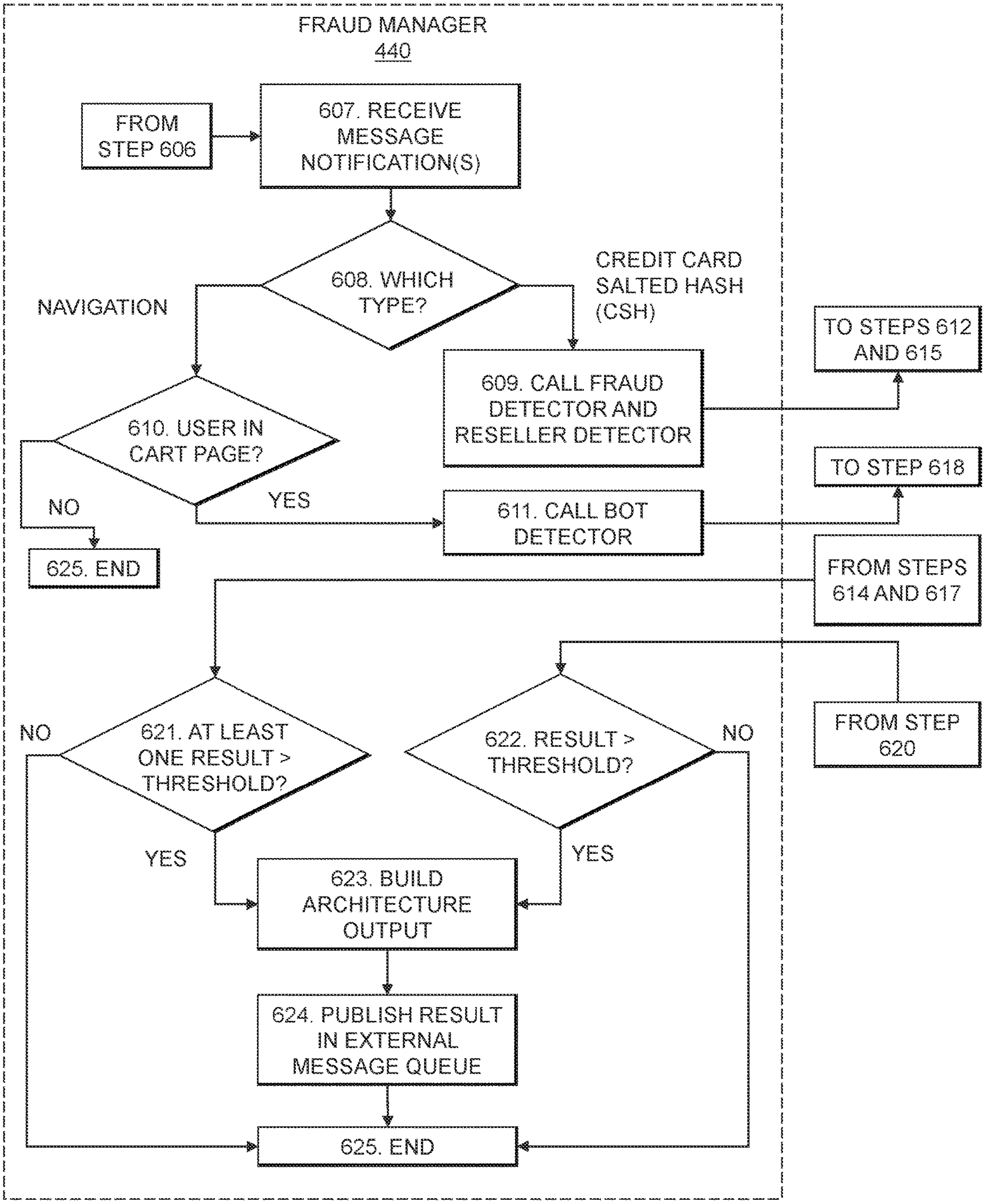
Figure 6C:
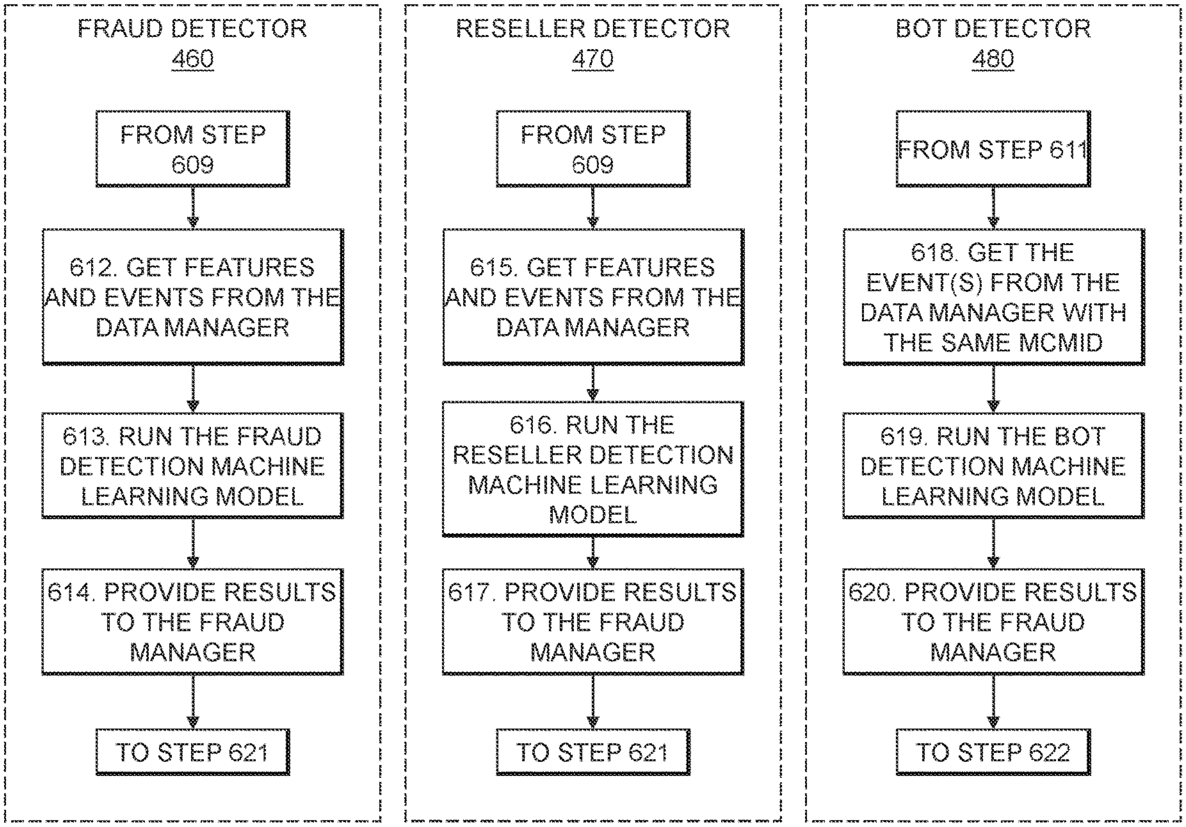

FIGS. 6A-6C show an execution flow for the microservices of the ML/AI system 400, showing the iterations that occur between the different microservices. As shown in FIG. 6A, the execution flow starts in step 600 each time a new event is captured by the streaming processor 420. The streaming processor 420 in step 601 listens for incoming events (e.g., CSH, NAV and PUR events that are generated by the e-commerce platform 106). In step 602, the streaming processor 420 parses and processes the incoming events for data storing. Such data storing may include updating features in an in-memory database in step 603-1 and/or storing events in a relational data base (e.g., event database 108) in step 603-2. In step 604, a determination is made as to whether steps 603-1 and/or 603-2 were successful. If the result of the step 604 determination is no, the execution flow ends in step 625. If the result of the step 604 determination is yes, the execution flow proceeds to step 605 where messages are published to the event manager 430 to notify that events have been detected. In step 606, the event manager 430 processes the messages and notifies any subscribers thereof and the execution flow proceeds to step 607 shown in FIG. 6B.

As shown in FIG. 6B, the fraud manager 440 in step 607 receives the message notifications which were sent from the event manager 430 in step 606. In step 608, the fraud manager 440 determines the event types of the detected events. If a detected event is a CSH event, the execution flow proceeds to step 609 where the fraud detector 460 and reseller detector 470 are called and the execution flow proceeds to steps 612 and 615 shown in FIG. 6C. If the detected event is a NAV event, the execution flow proceeds to step 610 where a determination is made as to whether the user is in a cart page. If the result of the step 610 determination is yes, the execution flow proceeds to step 611 where the bot detector 480 is called and the execution flow proceeds to step 618 also shown in FIG. 6C. If the result of the step 610 determination is no, the execution flow ends in step 625.

FIG. 6C shows the portions of the execution flow performed by the fraud detector 460, the reseller detector 470 and the bot detector 480. In step 612, the fraud detector 460 gets features and events from the data manager 410 (not shown). In some embodiments, the events are obtained from the relational database (e.g., the event database 108) while the features are obtained from an in-memory database or cache of the data manager 410. The fraud detector 460 runs a fraud detection machine learning model in step 613, and provides results back to the fraud manager 440 in step 614. In step 615, the reseller detector 470 gets features and events from the data manager 410 (not shown). In some embodiments, the events are obtained from the relational database (e.g., the event database 108) while the features are obtained from an in-memory database or cache of the data manager 410. The reseller detector 470 runs a reseller detector machine learning model in step 616, and provides results back to the fraud manager 440 in in step 617. Following steps 614 and 617, the execution flow proceeds with step 621 shown in FIG. 6B. In step 618, the bot detector 480 gets events from the data manager 410 (not shown) which have the same MCMID (e.g., a user unique identification based on web browser cookies). In some embodiments, the events are obtained from the relational database (e.g., the event database 108). The bot detector 480 runs a bot detection machine learning model in step 619, and provides results back to the fraud manager 440 in step 620. Following step 620, the execution flow proceeds with step 622 shown in FIG. 6B.

Returning to FIG. 6B, the fraud manager 440 in step 621 determines whether at least one of the results (e.g., from the fraud detector 460 and the reseller detector 470) exceeds associated thresholds. The fraud manager 440 in step 622 determines whether the results (e.g., from the bot detector 480) exceed some specified threshold (which may be the same as or different than the thresholds used in step 621). If the step 621 or step 622 determination is yes, the execution flow proceeds to step 623 where the architecture output (e.g., a notification) is built. In step 624, the resulting notification is published in the external message queue (e.g., the message queuing service 413, not shown), and the execution flow then ends in step 625. The execution flow also ends in step 625 if the result of the step 621 or 622 determination is no.

As described above, based on the type of event detected (e.g., the step 608 determination), the fraud manager 440 can trigger different ones of the machine learning services 405 of the ML/AI system 400. Bot detection can be performed at any moment that a customer is browsing the website or other interface of the e-commerce platform 106. Therefore, any time a NAV event arrives the fraud manager 440 may invoke the bot detector 480. While in FIG. 6B the bot detector 480 is called only if the user is determined to be in a "cart" page in step 610, this is not a requirement. The bot detector 480 may also be called when the user is not determined to be in the cart page (e.g., the step 610 determination may be bypassed, such that if the event is a NAV event the execution flow proceeds directly from step 608 to step 611). To predict fraud and reseller activity, the ML/AI system 400 may require more data regarding payment information such that the customer should have started the purchase process of one or more products before invoking the fraud detector 460 and reseller detector 470. When CSH events are generated, it means that the customer has already started the purchase process of one or more products and has provided credit card or other payment information. Thus, if the arriving event is determined to be a CSH event in step 608, the fraud manager 440 may invoke both the fraud detector 460 and the reseller detector 470 in step 609.

The machine learning models implemented by the fraud detector 460, the reseller detector 470 and the bot detector 480 perform specific tasks given the identification of the customer (e.g., via the MCMID field) in the particular events that started execution of the workflow. Based on the MCMID, the fraud detector 460, the reseller detector 470 and the bot detector 480 fetch data (e.g., from the in-memory database of the data manager 410 or the event database 108) to apply their respective machine learning models and to generate classifications together with probabilities (e.g., indicating confidence in the classifications) to return to the fraud manager 440. Finally, when receiving the results from the fraud detector 460, the reseller detector 470 and the bot detector 480, the fraud manager 440 in steps 621 and 622 check if the probabilities or confidence levels reach some pre-defined thresholds. If so, the fraud manager 440 generates messages provided to the external messaging queue (e.g., the message queuing service 413) to trigger various actions for handling possible fraud in the e-commerce platform 106.

Figure 7:
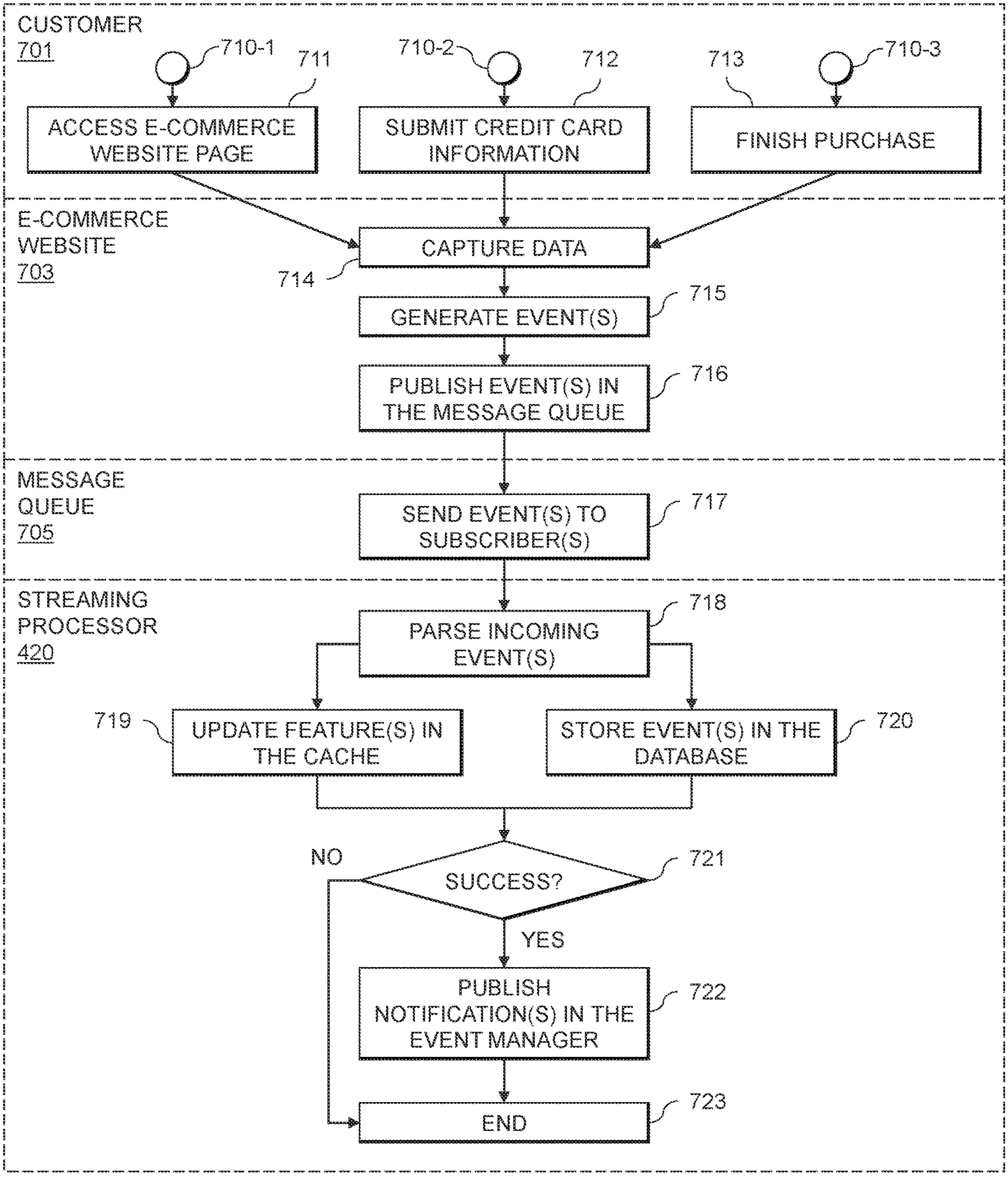
FIG. 7 shows a data acquisition process flow for a fraud prevention system in an illustrative embodiment.

Processes for data acquisition from the e-commerce platform 106 will now be described in further detail. A log monitoring platform and processing is used to acquire data from the e-commerce platform 106. FIG. 7 shows a process flow by which external data sources generate input data for the ML/AI system 400. Input data for the ML/AI system 400 may be generated each time 710-1 a customer 701 accesses an e-commerce website page 711 (or other interface of the e-commerce platform 106), each time 710-2 the customer 701 submits credit card or other payment information 712 to the e-commerce platform 106, and each time 710-3 the customer 701 finishes a purchase 713 on the e-commerce platform 106. The e-commerce platform 106, via an e-commerce website 703 or web server, in response to steps 711, 712 and 713, will capture data in step 714, generate an event in step 715, and publish the event in a message queue 705 in step 716. The message queue 705 in step 717 sends events to subscribers. The e-commerce website 703 and message queue 705 are an example implementation of event middleware such as the data logging system 411 and event message queue 311 or the event management system 409. In turn, the streaming processor 420 consumes the events from the message queue 705. The streaming processor 420 parses the incoming events in step 718, updates features in the in-memory database or cache in step 719 and stores an event in the relational database (e.g., event database 108) in step 720. In step 721, a determination is made as to whether steps 719 and 720 were successful. If the result of the step 721 determination is yes, notifications are published to the event manager 430 in step 722 and the FIG. 7 process ends in step 723. The FIG. 7 process also ends in step 723 if the result of the step 721 determination is no.

The features are computed values that the machine learning models (e.g., of the fraud detector 460, the reseller detector 470 and the bot detector 480) use to perform predictions or classifications. Updating the features in an in-memory database or cache in step 719 improves the retrieval performance for the machine learning models implemented by the fraud detector 460, the reseller detector 470 and the bot detector 480, which do not need to compute these values. The streaming processor 420 computes the feature values and updates them for each arriving event. The streaming processor 420 also stores the event data in a relational database (e.g., event database 108) in step 720 for future querying. This allows the ML/AI system 400 quick access to previous events, without depending on external sources. Moreover, historical events in the relational database can be used to compute new features that depend on time windows, which can vary depending on the particular algorithms used in the machine learning models of the fraud detector 460, the reseller detector 470 and the bot detector 480. The streaming processor 420, on successfully updating the feature data and stored events as determined in step 720, generates notifications by publishing events to the event manager 430. Each notification may include a message reporting the type of event that was processed. In some embodiments, the fraud manager 440 is the main process that receives the notifications and uses the notification content in decision-making processes. It should be appreciated, however, that any of the microservices in the ML/AI system 400 can consume such notifications to take action.

Figure 8:
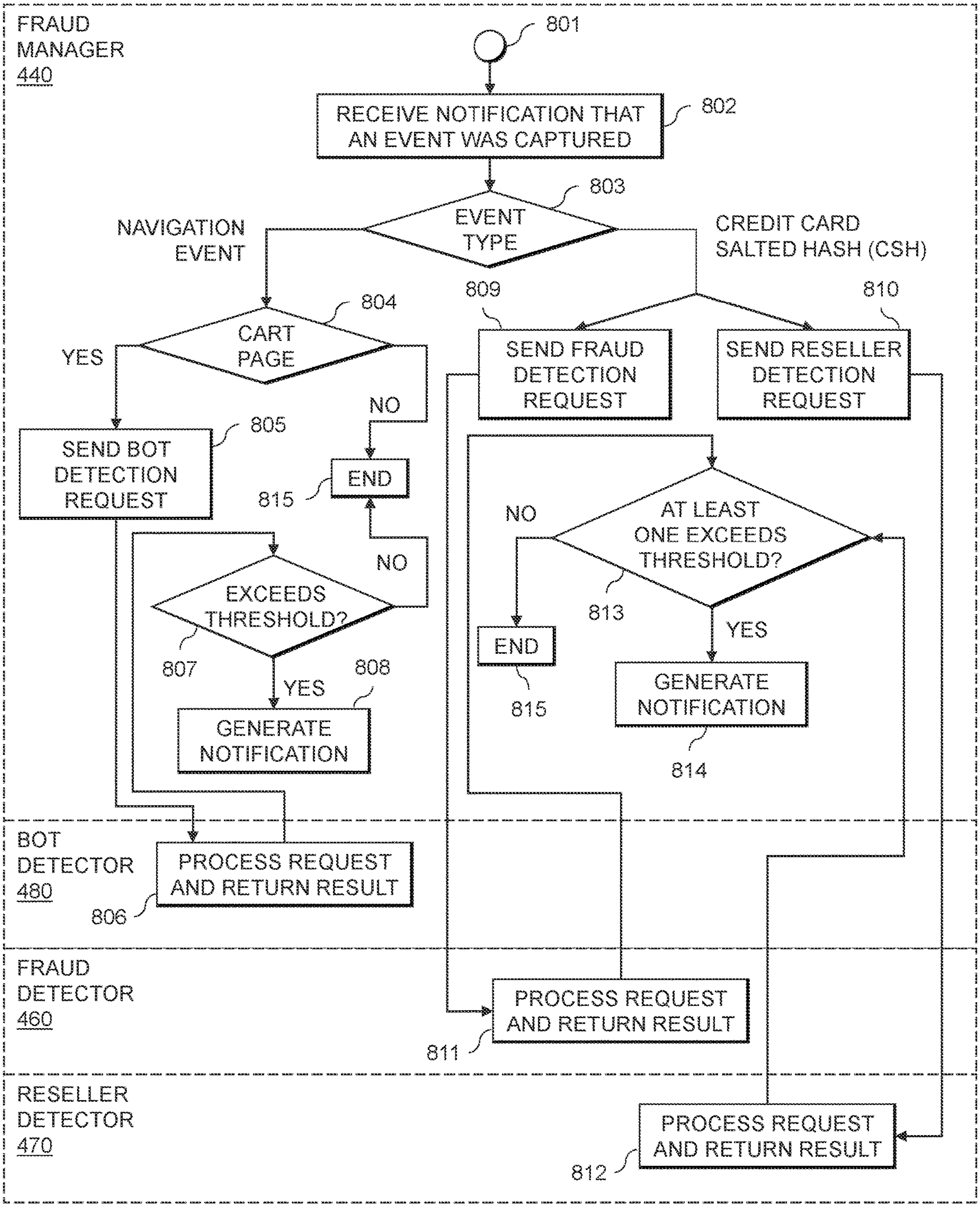
FIG. 8 shows a fraud management process flow for a fraud prevention system in an illustrative embodiment.

Fraud management will now be described in further detail with respect to the FIG. 8 process flow. The fraud manager 440 initiates the FIG. 8 process flow in step 801 to decide when to invoke the fraud detector 460, the reseller detector 470 and the bot detector 480. In step 802, the fraud manager 440 receives a notification that an event was captured (e.g., from the event manager 430). In step 803, a determination is made as to the event type of the captured event. If the event type is a NAV event, the fraud manager 440 in step 804 determines whether the customer is accessing the cart page. If the result of the step 804 determination is yes, the fraud manager 440 in step 805 sends a bot detection request to the bot detector 480. The bot detector 480 will process the request using its machine learning model and return a result back to the fraud manager 440 in step 806. In step 807, the fraud manager 440 determines whether the result exceeds some designated threshold. If the result of the step 807 determination is yes, a notification is generated in step 808. If the result of the step 807 determination is no, the FIG. 8 process ends in step 815. The FIG. 8 process also ends in step 815 if the result of the step 804 determination is no.

It should be noted that the step 804 determination is optional, and may be skipped in some embodiments (e.g., when step 803 detects a NAV event type then processing may proceed directly to step 805). In some embodiments, however, it is desired to determine whether the customer is accessing the cart page prior to invoking the bot detector 480 as being in the cart page is behavior indicating that the customer might be starting a purchase process. Therefore, at this point, the behavior of the customer leading up to being in the cart page (and activity within or subsequent to the cart page) is checked for possible automated bot behavior. The bot detection request sent in step 805 may include the customer's MCMID or another identifier. The bot detector 480 in step 806 processes the request and replies with a result (e.g., a probability or confidence level in classifying the customer behavior as representing an automated bot). The fraud manager 440 in step 807 compares this probability or confidence level against a threshold value and, when it exceeds the threshold value, the fraud manager 440 in step 808 generates a notification provided to the external message queue.

When receiving a CSH event notification from the event manager 430, the fraud manager 440 follows a different path in step 803. If the event type is determined to be a CSH event in step 803, the FIG. 8 process proceeds to steps 809 and 810 where fraud detection and reseller detection requests are provided to the fraud detector 460 and the reseller detector 470. In step 811, the fraud detector 460 uses its machine learning model to process the request and return results back to the fraud manager 440. In step 812, the reseller detector 470 uses its machine learning model to process the request and return results back to the fraud manager 440. In step 813, a determination is made as to whether at least one of the results from steps 811 and 812 exceeds an associated probability or confidence threshold. If the result of the step 813 determination is yes, a message is generated and provided to an external message queue in step 814. If the result of the step 813 determination is no, the FIG. 8 process ends in step 815. CSH events characterize attempts of the customer to provide valid credit card or other payment information on a payment page. This means that the customer has already started the purchase process and is trying to provide payment information. At this point, the ML/AI system 400 can cross-reference the customer information with behavior leading up to this point (as well as behavior on and subsequent to the payment page) to consider not only the pages that the customer has accessed but also past purchases made and payment information provided. The fraud manager 440 thus sends a request for both the fraud detector 460 and the reseller detector 470 in parallel providing the customer's MCMID or another identifier. Once the fraud detector 460 and the reseller detector 470 process the requests and reply with resultant probabilities or confidence levels, these are compared against distinct threshold values in step 813. In the case at least one of the probabilities or confidence levels exceeds its associated threshold, the fraud manager 440 in step 814 generates a notification to the external message queue.

The fraud detector 460, reseller detector 470 and bot detector 480 are configured to utilize machine learning algorithms to classify or compute the probability of customers being fraud actors, resellers and bots, respectively. In some embodiments, the fraud detector 460, reseller detector 470 and bot detector 480 utilize distinct machine learning models to compute such probabilities separately, where the distinct machine learning models may use different types of machine learning architectures.

The bot detector 480 may utilize a machine learning model implemented with Long-Short Term Memory (LSTM), a type of Recurrent Neural Network (RNN). As compared with a standard feedforward RNN, the LSTM has feedback connections. Thus, the LSTM approach helps avoid the vanishing gradient problem and keeps track of more minor proportional adjustments during the training process. This is important for bot detection, as browsing data may be mostly from non-bot users and the more minor features need to be recognized by the RNN to properly classify or estimate the probability of customer behavior representing an automated bot.

Figure 9:
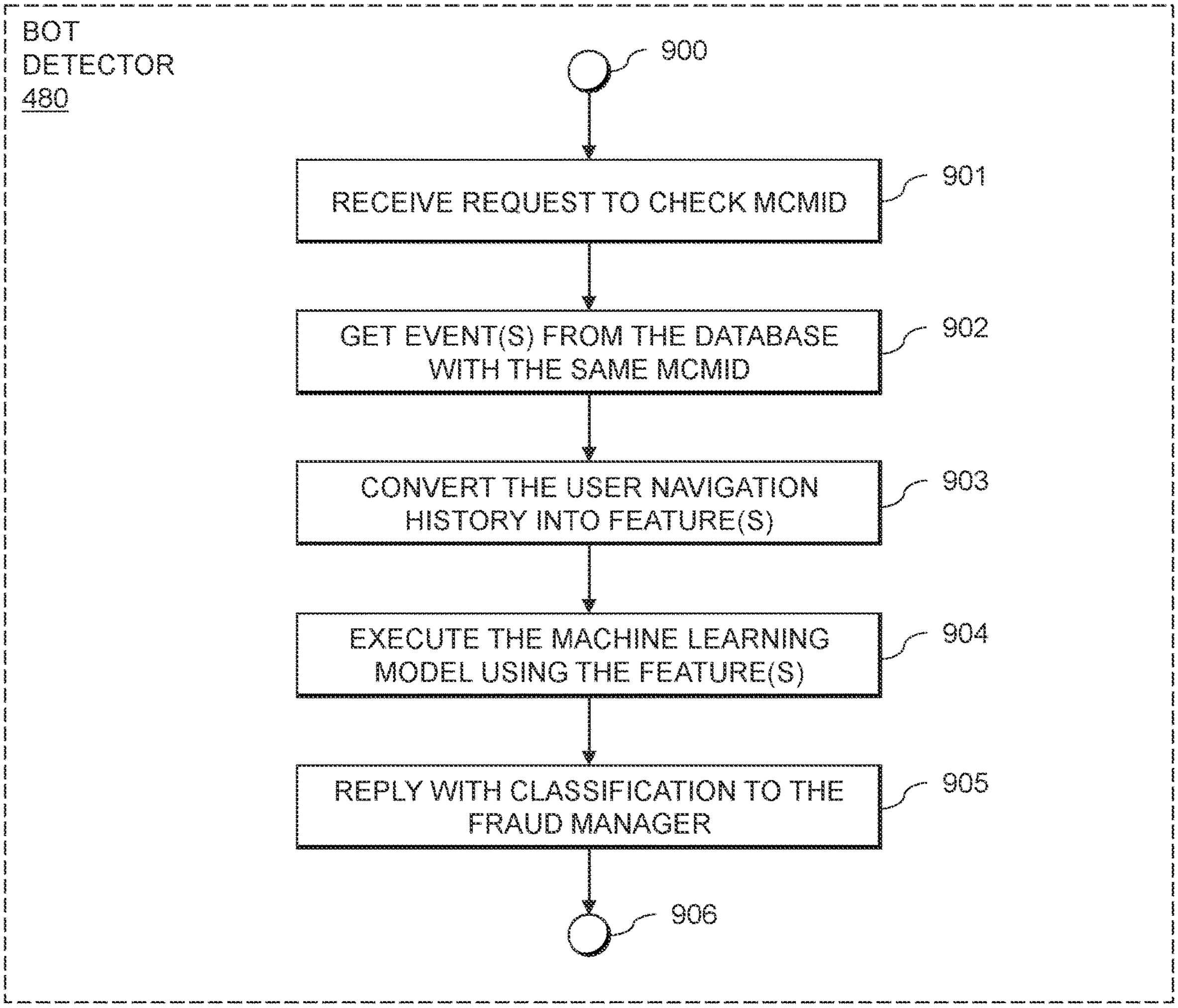
FIG. 9 shows a process flow for a bot detection machine learning model of a fraud prevention system in an illustrative embodiment.

FIG. 9 shows a process flow for the bot detector 480 machine learning algorithm. The process flow begins in step 900, and the bot detector 480 receives a request to compute the probability of the browsing behavior that is associated with a given MCMID or another user identifier being bot activity in step 901. In step 902, the bot detector 480 fetches events from the database which have the same MCMID or another user identifier that is in the step 901 request. In some embodiments, only events within some specified time window are fetched from the database in step 902. The bot detector 480 in step 903 then converts the user navigation history (e.g., as determined from the event data) into features suitable for input into the LSTM RNN machine learning model. In step 904, the bot detector 480 executes the LSTM RNN machine learning model using the features computed in step 903. A probability value or confidence level that the user navigation history for the given MCMID represents automated bot activity is produced by the LSTM RNN machine learning model. The bot detector 480 returns this probability value or confidence level (or some other value derived therefrom representing the probability value or confidence level) to the fraud manager 440 in step 905. The FIG. 9 process flow then ends in step 906.

The reseller detector 470 may utilize a MultiLayer Perceptron (MLP) machine learning model, which is a type of feedforward Artificial Neural Network (ANN). The MLP-ANN machine learning model may be trained with previous purchases recognized as reseller activity by the GAFT 371. Different features are extracted from such previous purchases, followed by parameter tuning to create an execution flow for the reseller detector 470's MLP-ANN machine learning model. The first part of the machine learning process is to create features from the dataset (e.g., the previous purchases recognized as reseller activity). In some embodiments, the features are built based on insights manually extracted from the dataset. The common patterns can be visualized when analyzing the past NAV, PUR and CSH events associated with previous purchases flagged as reseller activity by the GAFT 371. The idea is to collect the features from such past purchases during the customer navigation leading up to purchase, and to train the machine learning model using the labeled data.

FIG. 10 shows a table 1000 of features that are used in some embodiments to train and predict whether particular customer behavior represents reseller activity. To validate the selected feature set in table 1000, a GAFT analysis on reseller activity of previous purchases on the e-commerce platform 106 is performed. In some embodiments, validation is performed using five days' worth of data. The NAV, PUR and CSH information is also obtained for the same five day period. The dataset may be divided into training and test portions (e.g., with a 70/30 training/testing split), and a min-max normalization method is applied to maintain the general distribution and ratios of the data. Training of the reseller detector 470's MLP-ANN machine learning model was run for 100 epochs and evaluated using an Area Under Curve (AUC) metric. While accuracy measures the proportion of true positives and true negatives in the whole dataset, AUC measures the tradeoff between the true positive rate (TPR) (also referred to as recall) and false positive rate (FPR). The value of the AUC after the 100 epochs was 0.9704. Results are presented with a comparison between the tradeoff on the confidence threshold and the accuracy. Because the reseller detector 470 uses a neural network model, the outputs are presented as a number between 0 and 1. With that, it is possible to adjust the confidence level and see how the accuracy and the FPR change along the way. FIG. 11 shows a table 1100 summarizing the results of the reseller detector 470 experimental validation.

Figure 12:
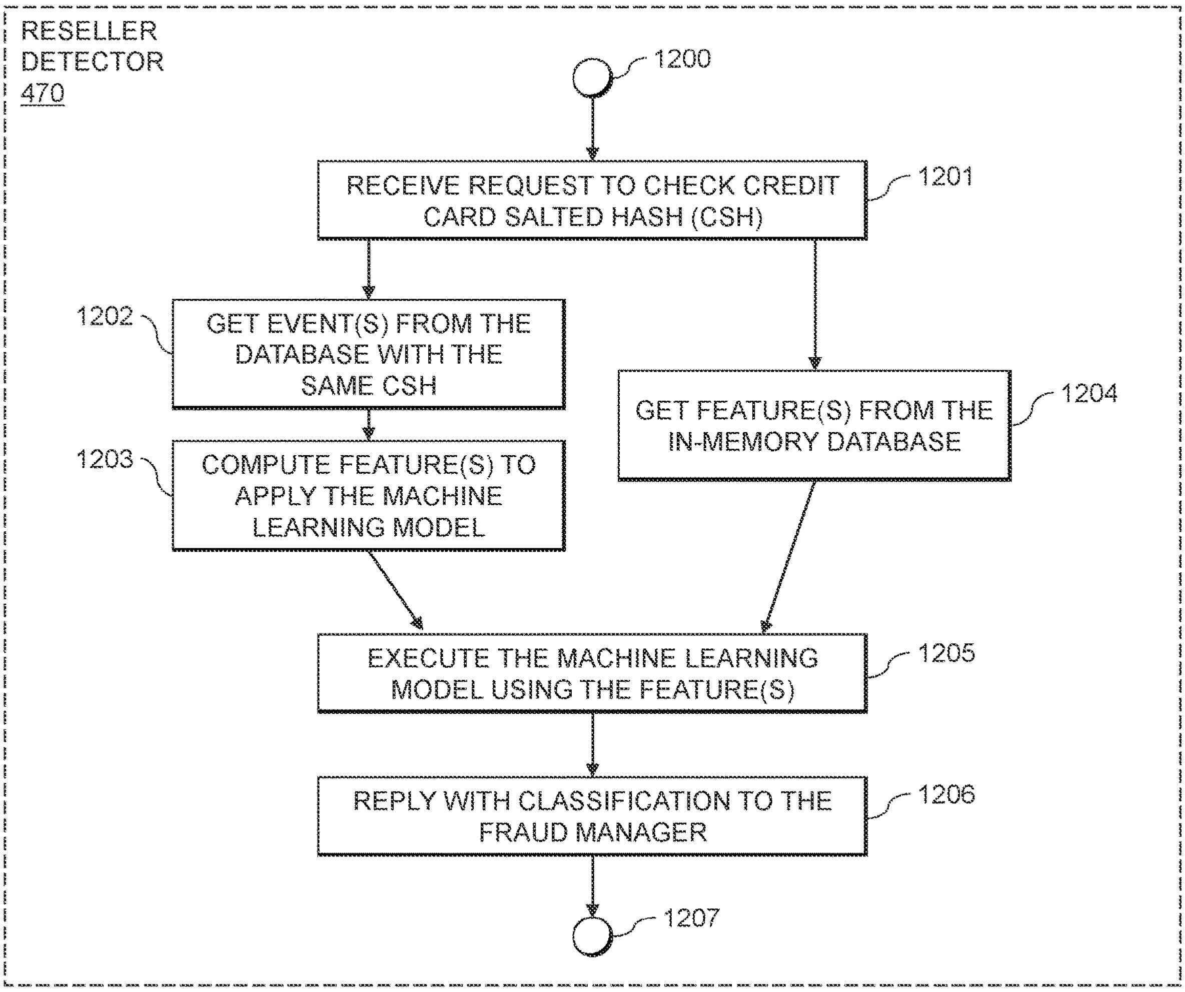
FIG. 12 shows a process flow for a reseller detection machine learning model of a fraud prevention system in an illustrative embodiment.

FIG. 12 shows a process flow for the reseller detector 470 executing its MLP-ANN machine learning model. The process flow starts in step 1200, and the reseller detector 470 in step 1201 receives a request to check a CSH event. In step 1202, the reseller detector 470 gets events from the database with the same CSH, and in step 1203 computes features from such CSH events for use as input to the MLP-ANN machine learning model. In step 1204, the reseller detector 470 gets features from the in-memory database or cache. The reseller detector 470 in step 1205 executes the MLP-ANN machine learning model using the features computed in step 1203 and obtained in step 1204. In step 1206, the reseller detector 470 replies to the fraud manager 440 with the classification results obtained from execution of the MLP-ANN machine learning model (e.g., a probability value or confidence measure of whether the customer behavior represents reseller activity). The FIG. 12 process flow then ends in step 1207. Here, the reseller detector 470 not only acquires CSH events from the database in step 1202, but also acquires already-calculated features from an in-memory database in step 1204. The reseller detector 470 can utilize previously-computed features, not needing to compute them again, which improves its performance.

The fraud detector 460 in some embodiments work with three processing branches, with each processing branch evaluating a different pattern of customer behavior during previous browsing. The first processing branch is navigation pattern analysis, where the NAV events for the customer are compared with NAV events for known fraud actors. The second processing branch is a risk analysis of past purchased products by the customer, where the risk of previous purchases are considered from PUR events for the customer. The third processing branch is a CSH comparison neural network, which classifies the CSH history based on analysis of CSH events of the customer.

Figure 14:
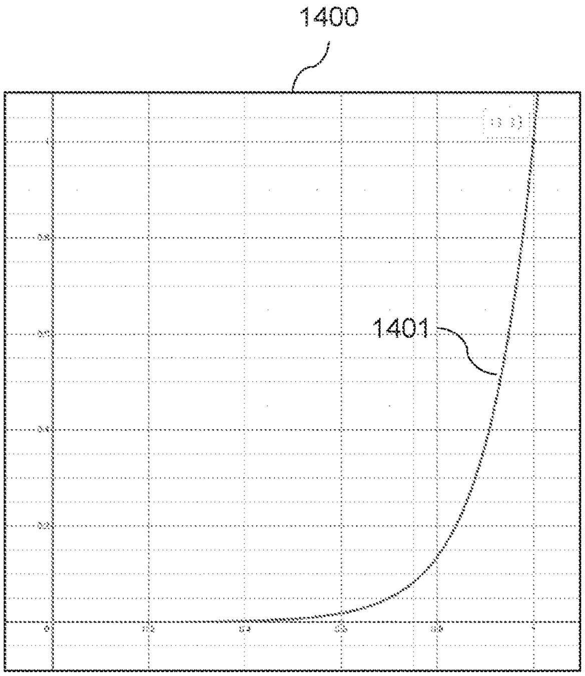
FIG. 14 shows a plot and tables illustrating fraud rates for different product types of an e-commerce platform in an illustrative embodiment.

For the first processing branch of fraud detection, there may be significant divergence between normal or non-malicious user browsing activity and fraudulent or malicious user browsing activity. Fraudulent user browsing activity, for example, may go straight to the shipping, review and payment pages of the e-commerce platform 106. Normal or non-malicious user browsing activity, in contrast, will typically be concentrated in other areas of the e-commerce platform 106 such as the homepage, search results, category pages, comparison pages, etc. FIG. 13 shows a table 1300 illustrating divergence in user behavior of normal and fraudulent users. For the second processing branch of fraud detection, e-commerce platform data may be analyzed to determine product risk. In some embodiments, the analysis indicates that certain types of products tend to be bought by fraudulent users. For example, gift cards and downloadable software are product types that tend to be bought by fraudulent users. For this reason, a function is used to evaluate the risk of previous purchases made by a user. In this case, the operation does not consider the user itself, but rather the risk of products which that user has bought. Consider an e-commerce platform which has a fraud rate of around 0.7-1.1% depending on the date or time of year. Every time a purchase is triggered or determined to be fraudulent, the rate for that specific item increases. If the proportion of normal-fraud is above some designated threshold for a particular product type, the user's purchase of products of that product type adds more risk to the user's purchase pattern. In some embodiments, the formula $f(x)=e^{(10x-10)}$ is used for evaluation. FIG. 14 shows a curve 1400 which fits the analyzed data shown in tables 1405 and 1410 and thus withdraws the need for normalization. Each product or product type can be distributed along the line 1401 in the curve 1400 according to its fraud rate.

For the third processing branch of fraud detection, the CSH behavior of normal and fraudulent purchases is compared. In some embodiments, the same CSH features (the first six entries) as shown in the table 1000 of FIG. 10 are used. The fraud detector 460 may use an MLP-ANN machine learning model similar to that of the reseller detector 470. Here, the MLP-ANN machine learning model is trained based on previous purchases that were identified as fraudulent and non-fraudulent, though only CSH event information is considered. The robustness of the fraud detector 460 comes together with a harmonic mean. This method is ideal for not penalizing normal users who are in a rush and went directly to the last phase of the purchase, or are trying to buy a product marked as highly fraudulent (e.g., gift cards). The table 1500 of FIG. 15 shows experimental results combining the three processing branches of analysis used by the fraud detector 460.

Figure 16:
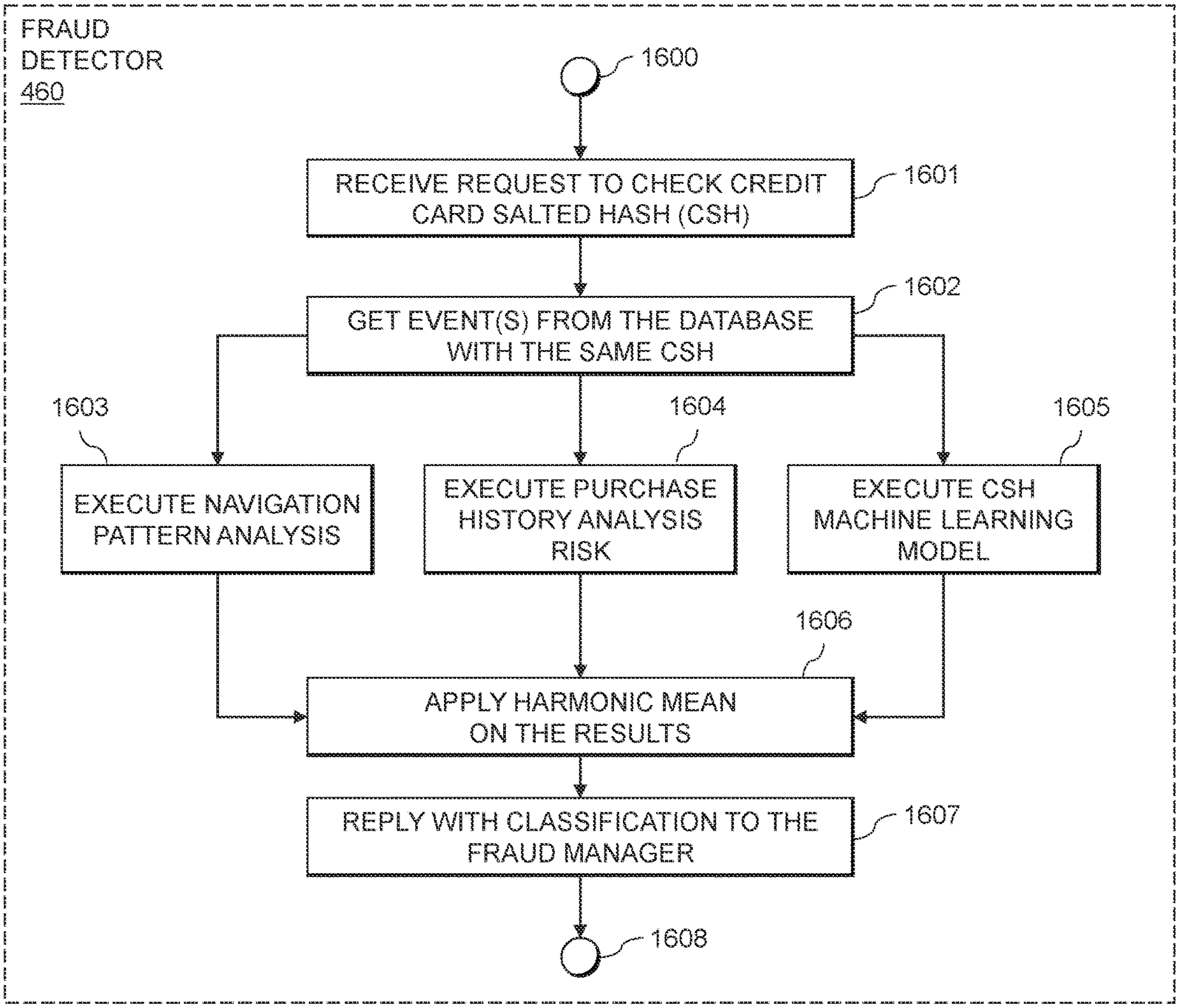
FIG. 16 shows a process flow for a fraud detection machine learning model of a fraud prevention system in an illustrative embodiment.

FIG. 16 shows a process flow for the fraud detector 460 executing its MLP-ANN machine learning model. The process flow starts in step 1600, and the fraud detector 460 in step 1601 receives a request to check a CSH event. In step 1602, the fraud detector 460 gets events from the database with the same CSH. The FIG. 16 process then breaks into the three processing branches in steps 1603, 1604 and 1605. Unlike the reseller detector 470, the fraud detector 460 may compute its own feature data. In steps 1603 and 1604, navigation pattern analysis and purchase history analysis risk are performed as described above. In step 1605, the MLP-ANN machine learning model for CSH events is executed as described above. The fraud detector 460 in step 1606 applies a harmonic mean on the results produced in steps 1603, 1604 and 1605 (e.g., which may be values between 0 and 1 as discussed above). In step 1607, the fraud detector 460 replies to the fraud manager 440 with the classification results (e.g., a probability value or confidence measure of whether the customer behavior represents fraudulent activity) obtained from step 1606. The FIG. 16 process flow then ends in step 1608.

Figure 17:
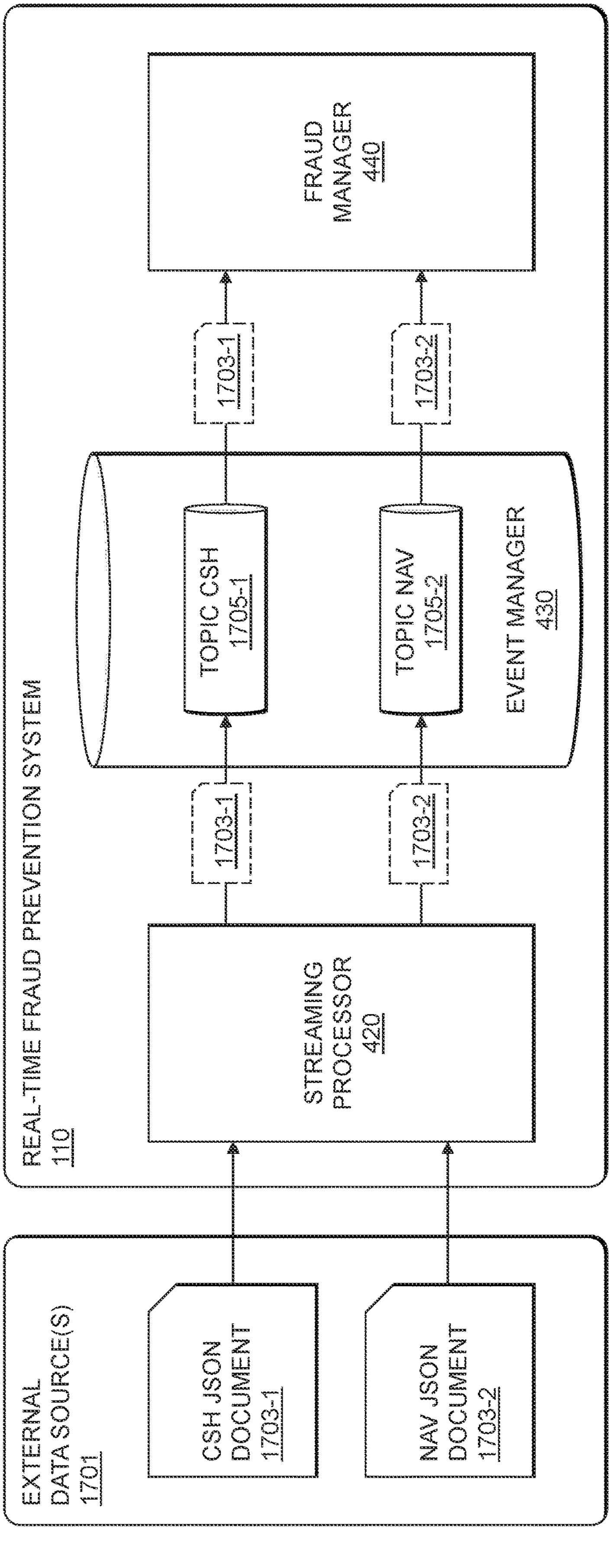
FIG. 17 shows an architecture for streaming of event data via topics in an event manager of a fraud prevention system in an illustrative embodiment.

Event management will now be described in further detail. The real-time fraud prevention system 110, which may be implemented using ML/AI system 400, uses an event manager 430 that provides a distributed event streaming platform. In some embodiments, the distributed event streaming platform is implemented using an Apache Kafka Broker. FIG. 17 shows an example architecture including external data sources 1701 which provide event data to the real-time fraud prevention system 110. The event data, which may be in the form of JavaScript Object Notation (JSON) documents or data such as CSH and NAV JSON documents 1703-1 and 1703-2, is processed by the streaming processor 420 and then sent to the event manager 430 as shown. The event manager 430 provides a centralized notification solution for other ones of the microservices in the ML/AI system 400. To do so, the event manager 430 may implement different topics, including CSH and NAV topics 1705-1 and 1705-2. As the names suggest, the CSH topic 1705-1 is used to publish notifications informing when CSH events are successfully processed by the streaming processor 420, and the NAV topic 1705-2 is used to publish notifications informing when NAV events are successfully processed by the streaming processor 420. The streaming processor 420 is responsible for publishing the data in these topics, while the fraud manager 440 is responsible for consuming them. When publishing data, the streaming processor 420 sends the event data (e.g., CSH and NAV JSON documents 1703-1 and 1703-2) as payloads, and the fraud manager 440 can receive all information regarding the events to use in its decision-making processes. While in the FIG. 17 architecture only the streaming processor 420 and the fraud manager 440 are shown as using the event manager 430, at any point other ones of the microservices in the ML/AI system 400 can use the event manager 430 for generating notifications.

The real-time fraud prevention system 110, which may be implemented using the ML/AI system 400, use data from external sources (e.g., 1701), which the streaming processor 420 acquires when events are available. The streaming processor 420 parses the events and stores event data locally for faster retrieval by other microservices in the ML/AI system 400 (e.g., for use in the machine learning models implemented by the fraud detector 460, reseller detector 470 and bot detector 480). In this context, a local data storage strategy is used, where data is stored in accordance with two different database models: a relational database (e.g., using PostgreSQL) and an in-memory database (e.g., using Redis).

The relational database stores all events that are acquired from the external sources. The relational database may employ Structured Query Language (SQL) for managing data. In some embodiments, the TimescaleDB PostgreSQL extension is used to improve performance and scalability for time series data. Each event that is processed follows a time sequence as the events are collected by the e-commerce platform 106. Time is an important factor when analyzing data in the machine learning models of the fraud detector 460, the reseller detector 470 and the bot detector 480. Therefore, using TimescaleDB aims at improving the performance for analyzing time series data. PostgreSQL and TimescaleDB may be used in IoT deployments that generate massive amounts of data. Thus, this combination can offer superior performance when compared with other solutions. FIGS. 18A-C show tables 1800, 1805 and 1810 illustrating the database schema used for storing each incoming event according to its event type. The table 1800 shows the schema used for NAV events, the table 1805 shows the schema used for PUR events, and the table 1810 shows the schema used for CSH events.

The in-memory database or cache maintains instances of features which the machine learning models of the fraud detector 460, the reseller detector 470 and the bot detector 480 utilize. These features include key values that are updated according to the events' data. This strategy aims at improving the performance of the machine learning models by maintaining updated values for the features for quick access, which advantageously avoids requiring the machine learning models to compute the features every time they need them. In other words, without the in-memory database, the machine learning models would have to query several events from the relational database to compute the features. This would undesirably increase the real-time fraud prevention system 110's response time. The machine learning models implemented by the fraud detector 460, the reseller detector 470 and the bot detector 480 can access the features directly in memory via the in-memory database or cache, improving the response time. Table 1900 of FIG. 19 shows various "keys" that the streaming processor 420 updates each time it processes an event. The table 1900 uses the % FIELD notation to represent a variable in the name of the keys, which means that there are several keys from the same type but for different field values.

Figure 20:
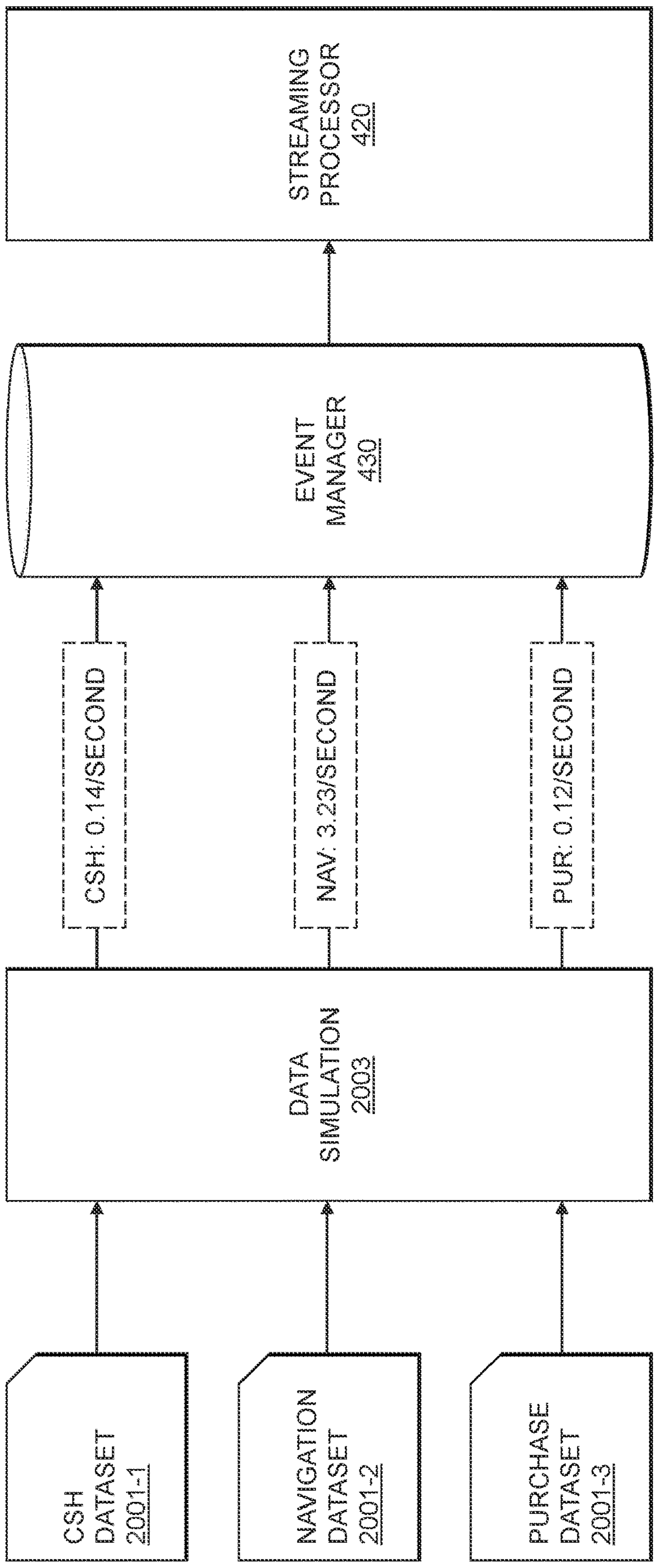
FIG. 20 shows a data simulation for event processing by an event manager of a fraud prevention system in an illustrative embodiment.

To test the feasibility of the ML/AI system 400, a benchmark was created based on real data to assess the system performance. FIG. 20 shows an architecture of the benchmark, which includes an additional data simulation module 2003 which reads CSH, navigation and purchase datasets 2001-1, 2001-2 and 2001-3 from disk and inputs them to the event manager 430. The data simulation 2003 reads from each of the datasets 2001-1, 2001-2 and 2001-3 and publishes the events from each at different rates. For the CSH dataset 2001-1, the data simulation 2003 publishes 0.14 events per second (one event every 7.11 seconds). For the navigation dataset 2001-2, the data simulation 2003 publishes 3.23 events per second. For the purchase dataset 2001-3, the data simulation 2003 publishes 0.12 purchase events per second (one event every 8.67 seconds).

The performance evaluation measures the time that the streaming processor 420 and the fraud manager 440 take to process events. The streaming processor 420 and the fraud manager 440 perform some of the main computations in the ML/AI system 400, and depend on the other microservices. Therefore, the streaming processor 420 and the fraud manager 440 are responsible for processing the events from start to end. To measure time, the benchmark records timestamps at the following steps: (1) when an event arrives at the event manager 430 (e.g., a Kafka Broker); (2) when the streaming processor 420 consumes the event from the event manager 430; (3) when the streaming processor 420 finishes storing the event and publishes it in the event manager 430; (4) when the fraud manager 440 consumes the event from the event manager 430; and (5) when the fraud manager 440 finishes processing the event and optionally generates output (e.g., one or more notifications published to the message queuing service 413).

Figure 21:
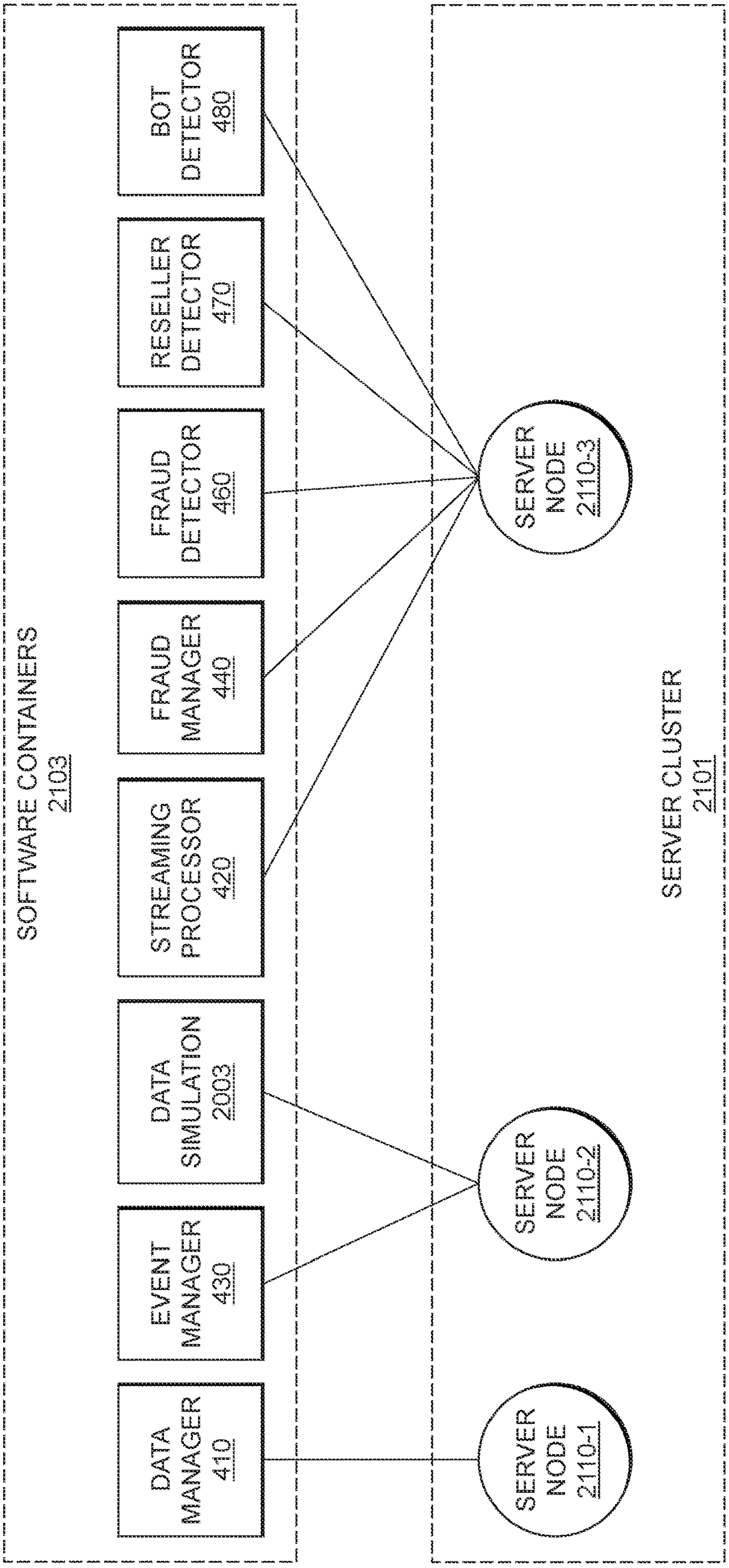
FIG. 21 shows software containers implementing microservices of a fraud prevention system running on different server nodes of a server cluster in an illustrative embodiment.

In addition, resource consumption is an important aspect of evaluation. Memory and processor (e.g., central processing unit (CPU)) consumption can demonstrate the system's requirements and trends. Therefore, the benchmark evaluation records the CPU and memory usage of each of the software containers 401, 402, 403, 404, 406, 407 and 408 in the ML/AI system 400 periodically (e.g., every 8 seconds). To run experiments, the system shown in FIG. 21 was employed, which includes a server cluster 2101 having server nodes 2110-1, 2110-2 and 2110-3 (collectively, server nodes 2110). The different software containers 401, 402, 403, 404, 406, 407 and 408 in the ML/AI system 400, represented as element 2103 in FIG. 21, run the different microservices on different ones of the server nodes 2110. The data manager 410 runs on server node 2110-1, the event manager 430 and data simulation 2003 run on the server node 2110-2, and the streaming processor 420, fraud manager 440, fraud detector 460, reseller detector 470 and bot detector 480 run on server node 2110-3. In some embodiments, each of the server nodes 2110 in the server cluster 2101 has 16 gigabytes (GB) of random-access memory (RAM), two 12-core Intel Xeon CPUs, and a Gigabit Ethernet network interface.

To evaluate the system performance, the data workflow was executed for six consecutive hours. FIG. 22 shows a table 2200 with the processing time results obtained after running the benchmark experiments. The streaming processor 420 time considers the time between steps (2) and (3), while the fraud manager 440 time considers the time between steps (4) and (5). The total time represents the time between steps (1) and (5). In summary, the average time to process an event and generate the system output is 54.1 milliseconds. FIG. 23 shows a table 2300 with average resource consumption (memory and CPU percentage) of the different microservices during the benchmark experiments. The streaming processor 420 is the microservice with the highest CPU consumption percentage, since it processes all events without exception. Regarding memory consumption, the event manager 430 consumes more memory than the other microservices since it stores a high volume of data that increases according to the incoming data.

Conventional approaches for fraud mitigation rely on systems that detect fraudsters' actions only after they occur. The technical solutions described herein provide an architecture for real-time prediction strategies to identify undesirable (e.g., potentially fraudulent) behavior of users as they navigate and complete purchase processes in an e-commerce platform. Through machine learning-based predictions, the technical solutions described herein can classify user behavior as possibly fraudulent (e.g., credit card or other payment fraud), reseller activity and automated bot applications. This enables fraud prevention, which provides technical advantages relative to approaches that only detect fraud for actions that have already taken place in the e-commerce platform.

The technical solutions described herein advantageously provide an innovative real-time system architecture for classifying the behavior of users as the users browse an e-commerce platform and navigate through purchase processes. A real-time feature extraction strategy is provided that rapidly computes the features while users request pages in the website or other interface in the e-commerce platform, and employs a caching strategy for better response time in the machine learning models which use such features. Some embodiments also provide a new approach for identifying potentially fraudulent or malicious user behavior as users navigate the website or other interface of the e-commerce platform. The technical solutions described herein further provide a set of features that can be used to classify reseller users before they place purchase orders in the e-commerce platform. The technical solutions described herein further provide a scalable and extensible system that provides APIs for easy integration with any e-commerce platform technology. The various technical advantages described herein provide a promising strategy for mitigating risks in e-commerce platforms, which can leverage profit by avoiding loss of revenue to fraudulent transactions. The technical solutions described herein provide operators a better way to control fraud and reseller activity in the customers' shopping experience. This also brings various benefits to customers or end-users of an e-commerce platform, as a more secure experience can be provided which can avoid or reduce supply shortages.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

Illustrative embodiments of processing platforms utilized to implement functionality for detecting potentially malicious behavior on an e-commerce platform utilizing machine learning will now be described in greater detail with reference to FIGS. 24 and 25. Although described in the context of system 100, these platforms may also be used to implement at least portions of other information processing systems in other embodiments.

Figure 24:
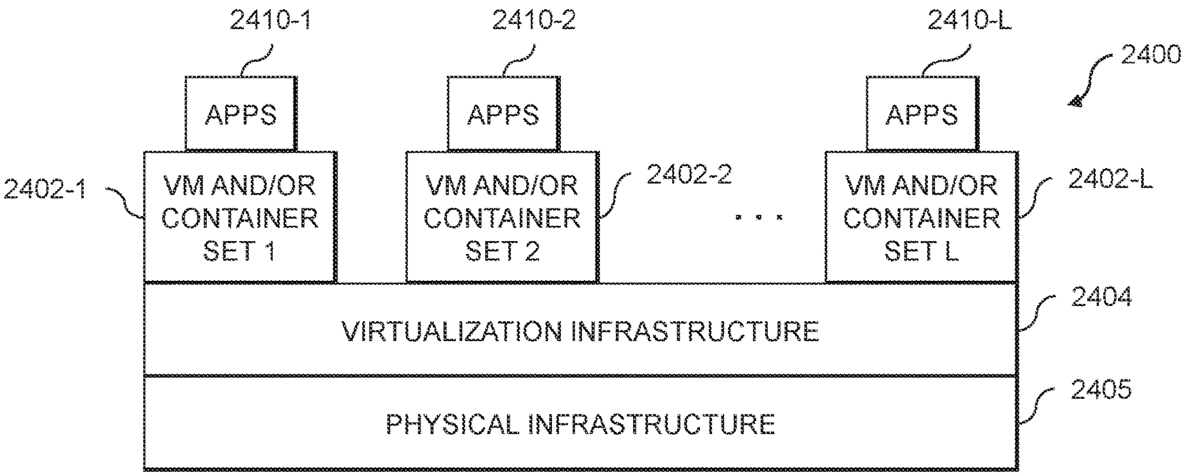
FIGS. 24 and 25 show examples of processing platforms that may be utilized to implement at least a portion of an information processing system in illustrative embodiments.
Figure 25:
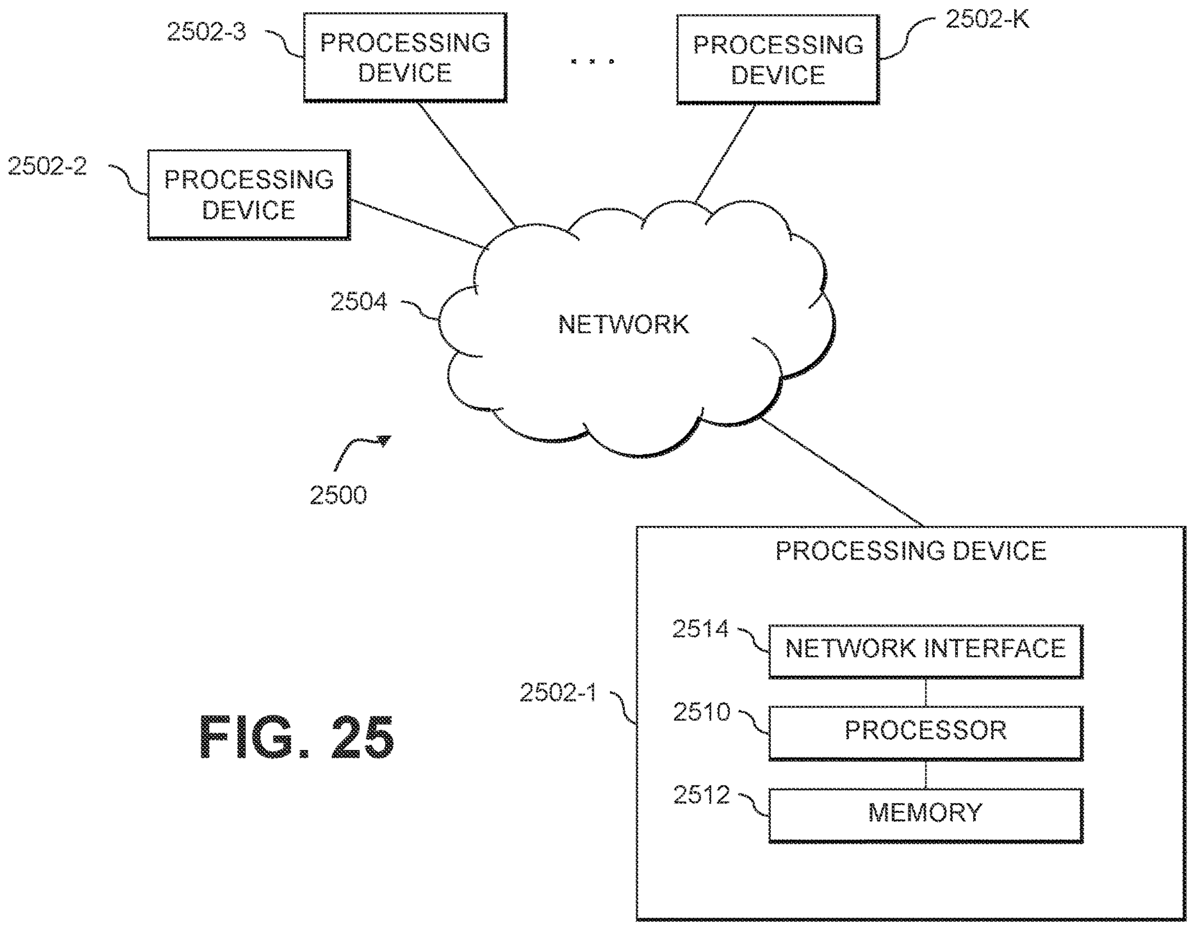

FIG. 24 shows an example processing platform comprising cloud infrastructure 2400. The cloud infrastructure 2400 comprises a combination of physical and virtual processing resources that may be utilized to implement at least a portion of the information processing system 100 in FIG. 1. The cloud infrastructure 2400 comprises multiple virtual machines (VMs) and/or container sets 2402-1, 2402-2, . . . 2402-L implemented using virtualization infrastructure 2404. The virtualization infrastructure 2404 runs on physical infrastructure 2405, and illustratively comprises one or more hypervisors and/or operating system level virtualization infrastructure. The operating system level virtualization infrastructure illustratively comprises kernel control groups of a Linux operating system or other type of operating system.

The cloud infrastructure 2400 further comprises sets of applications 2410-1, 2410-2, . . . 2410-L running on respective ones of the VMs/container sets 2402-1, 2402-2, . . . 2402-L under the control of the virtualization infrastructure 2404. The VMs/container sets 2402 may comprise respective VMs, respective sets of one or more containers, or respective sets of one or more containers running in VMs.

In some implementations of the FIG. 24 embodiment, the VMs/container sets 2402 comprise respective VMs implemented using virtualization infrastructure 2404 that comprises at least one hypervisor. A hypervisor platform may be used to implement a hypervisor within the virtualization infrastructure 2404, where the hypervisor platform has an associated virtual infrastructure management system. The underlying physical machines may comprise one or more distributed processing platforms that include one or more storage systems.

In other implementations of the FIG. 24 embodiment, the VMs/container sets 2402 comprise respective containers implemented using virtualization infrastructure 2404 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of system 100 may each run on a computer, server, storage device or other processing platform element. A given such element may be viewed as an example of what is more generally referred to herein as a "processing device." The cloud infrastructure 2400 shown in FIG. 24 may represent at least a portion of one processing platform. Another example of such a processing platform is processing platform 2500 shown in FIG. 25.

The processing platform 2500 in this embodiment comprises a portion of system 100 and includes a plurality of processing devices, denoted 2502-1, 2502-2, 2502-3, . . . 2502-K, which communicate with one another over a network 2504.

The network 2504 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 2502-1 in the processing platform 2500 comprises a processor 2510 coupled to a memory 2512.

The processor 2510 may comprise a microprocessor, a microcontroller, an application-specific integrated circuit (ASIC), a field-programmable gate array (FPGA), a central processing unit (CPU), a graphical processing unit (GPU), a tensor processing unit (TPU), a video processing unit (VPU) or other type of processing circuitry, as well as portions or combinations of such circuitry elements.

The memory 2512 may comprise random access memory (RAM), read-only memory (ROM), flash memory or other types of memory, in any combination. The memory 2512 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 2502-1 is network interface circuitry 2514, which is used to interface the processing device with the network 2504 and other system components, and may comprise conventional transceivers.

The other processing devices 2502 of the processing platform 2500 are assumed to be configured in a manner similar to that shown for processing device 2502-1 in the figure.

Again, the particular processing platform 2500 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

As indicated previously, components of an information processing system as disclosed herein can be implemented at least in part in the form of one or more software programs stored in memory and executed by a processor of a processing device. For example, at least portions of the functionality for detecting potentially malicious behavior on an e-commerce platform utilizing machine learning as disclosed herein are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems, computing devices, etc. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. An apparatus comprising:

at least one processing device comprising a processor coupled to a memory;

the at least one processing device being configured to perform steps of:

monitoring for one or more events associated with one or more users interacting with an e-commerce platform;

parsing the one or more events to pre-compute a plurality of features, wherein different subsets of the plurality of pre-computed features are utilized by different ones of a plurality of machine learning models;

maintaining the plurality of pre-computed features in an in-memory database;

identifying an event type of a given one of the one or more events, the given event being associated with a given one of the one or more users interacting with the e-commerce platform;

selecting, based at least in part on the identified event type associated with the given event, at least one of the plurality of machine learning models, the plurality of machine learning models being configured to characterize different types of potentially malicious behavior on the e-commerce platform;

dynamically deploying one or more microservice instances implementing the selected at least one of the plurality of machine learning models, wherein the one or more microservice instances are configured to retrieve, from the in-memory database, at least one of the different subsets of the plurality of pre-computed features;

determining, utilizing the selected at least one of the plurality of machine learning models and the retrieved at least one subset of the plurality of pre-computed features, whether the given user is exhibiting at least one of the different types of potentially malicious behavior on the e-commerce platform; and responsive to determining that the given user is exhibiting said at least one of the different types of potentially malicious behavior on the e-commerce platform, initiating one or more actions on the e-commerce platform to at least one of prevent the potentially malicious behavior of the given user and mitigate an effect of the potentially malicious behavior of the given user;

wherein the determination of whether the given user is exhibiting at least one of the different types of potentially malicious behavior on the e-commerce platform is dynamically updated as the given user interacts with the e-commerce platform based at least in part on one or more updates to the plurality of pre-computed features maintained in the in-memory database.

2. The apparatus of claim 1 wherein monitoring for the one or more events associated with the one or more users interacting with the e-commerce platform further comprises updating an event database with event information for the one or more events.

3. The apparatus of claim 1 wherein identifying the event type of the given event comprises determining whether the given event is one of:

a navigation event whereby the given user moves between two or more pages of an interface of the e-commerce platform;

a purchase event whereby the given user purchases one or more products or services from the e-commerce platform; and a payment event whereby the given user submits payment information to the e-commerce platform.

4. The apparatus of claim 3 wherein the payment event comprises a credit card salted hash event generated when the given user submits credit card information as a payment method for one or more purchase orders on the e-commerce platform.

5. The apparatus of claim 1 wherein the plurality of different machine learning models comprise: a fraud detection machine learning model, a reseller detection machine learning model, and a bot detection machine learning model.

6. The apparatus of claim 5 wherein responsive to the identified event type of the given event being a navigation event whereby the given user moves between two or more pages of an interface of the e-commerce platform, the selected at least one of the plurality of machine learning models comprises the bot detection machine learning model.

7. The apparatus of claim 5 wherein responsive to the identified event type of the given event being a payment event whereby the given user submits payment information to the e-commerce platform, the selected at least one of the plurality of machine learning models comprises the fraud detection machine learning model and the reseller detection machine learning model.

8. The apparatus of claim 5 wherein the fraud detection machine learning model and the reseller detection machine learning model comprise respective Multi-Layer Perceptron (MLP) Artificial Neural Network (ANN) machine learning models.

9. The apparatus of claim 5 wherein the fraud detection machine learning model is trained with a set of historical events recognized as fraudulent activity, and wherein the fraud detection machine learning model is configured to use said at least one of the different subsets of the plurality of pre-computed features and one or more additional payment events having the same submitted payment information as the given event, and wherein an output of the fraud detection machine learning model is combined with an analysis of a navigation pattern of the given user on an interface of the e-commerce platform and a purchase history analysis of the given user on the interface of the e-commerce platform to characterize whether the given user is exhibiting fraudulent behavior on the e-commerce platform.

10. The apparatus of claim 5 wherein the reseller detection machine learning model is trained with a set of historical events recognized as reseller activity, wherein the reseller detection machine learning model uses said at least one of the different subsets of the plurality of pre-computed features and one or more additional payment events having the same submitted payment information as the given event, and wherein an output of the reseller detection machine learning model characterizes whether the given user is exhibiting reseller behavior on the e-commerce platform.

11. The apparatus of claim 5 wherein the bot detection machine learning model comprises a Long-Short Term Memory (LSTM) Recurrent Neural Network (RNN) machine learning model.

12. The apparatus of claim 5 wherein the bot detection machine learning model uses the given event and the one or more additional events associated with the given user to characterize a navigation pattern of the given user on an interface of the e-commerce platform, and wherein an output of the bot detection machine learning model characterizes whether the given user is exhibiting automated bot behavior on the e-commerce platform.

13. The apparatus of claim 1 wherein the one or more actions initiated on the e-commerce platform comprise at least one action that prevents the given user from completing one or more purchases on the e-commerce platform.

14. The apparatus of claim 1 wherein the one or more actions initiated on the e-commerce platform comprises at least one action for implementing additional security analysis prior to permitting the given user to complete one or more purchases on the e-commerce platform.

15. A computer program product comprising a non-transitory processor-readable storage medium having stored therein program code of one or more software programs, wherein the program code when executed by at least one processing device causes the at least one processing device to perform steps of:

monitoring for one or more events associated with one or more users interacting with an e-commerce platform;

parsing the one or more events to pre-compute a plurality of features, wherein different subsets of the plurality of pre-computed features are utilized by different ones of a plurality of machine learning models;

maintaining the plurality of pre-computed features in an in-memory database;

identifying an event type of a given one of the one or more events, the given event being associated with a given one of the one or more users interacting with the e-commerce platform;

selecting, based at least in part on the identified event type associated with the given event, at least one of the plurality of machine learning models, the plurality of machine learning models being configured to characterize different types of potentially malicious behavior on the e-commerce platform;

dynamically deploying one or more microservice instances implementing the selected at least one of the plurality of machine learning models, wherein the one or more microservice instances are configured to retrieve, from the in-memory database, at least one of the different subsets of the plurality of pre-computed features;

determining, utilizing the selected at least one of the plurality of machine learning models and the retrieved at least one subset of the plurality of pre-computed features, whether the given user is exhibiting at least one of the different types of potentially malicious behavior on the e-commerce platform; and responsive to determining that the given user is exhibiting said at least one of the different types of potentially malicious behavior on the e-commerce platform, initiating one or more actions on the e-commerce platform to at least one of prevent the potentially malicious behavior of the given user and mitigate an effect of the potentially malicious behavior of the given user;

wherein the determination of whether the given user is exhibiting at least one of the different types of potentially malicious behavior on the e-commerce platform is dynamically updated as the given user interacts with the e-commerce platform based at least in part on one or more updates to the plurality of pre-computed features maintained in the in-memory database.

16. The computer program product of claim 15 wherein the plurality of different machine learning models comprise: a fraud detection machine learning model, a reseller detection machine learning model, and a bot detection machine learning model.

17. The computer program product of claim 16 wherein:

responsive to the identified event type of the given event being a navigation event whereby the given user moves between two or more pages of an interface of the e-commerce platform, the selected at least one of the plurality of machine learning models comprises the bot detection machine learning model; and responsive to the identified event type of the given event being a payment event whereby the given user submits payment information to the e-commerce platform, the selected at least one of the plurality of machine learning models comprises the fraud detection machine learning model and the reseller detection machine learning model.

18. A method comprising:

monitoring for one or more events associated with one or more users interacting with an e-commerce platform;

parsing the one or more events to pre-compute a plurality of features, wherein different subsets of the plurality of pre-computed features are utilized by different ones of a plurality of machine learning models;

maintaining the plurality of pre-computed features in an in-memory database;

identifying an event type of a given one of the one or more events, the given event being associated with a given one of the one or more users interacting with the e-commerce platform;

selecting, based at least in part on the identified event type associated with the given event, at least one of the plurality of machine learning models, the plurality of machine learning models being configured to characterize different types of potentially malicious behavior on the e-commerce platform;

dynamically deploying one or more microservice instances implementing the selected at least one of the plurality of machine learning models, wherein the one or more microservice instances are configured to retrieve, from the in-memory database, at least one of the different subsets of the plurality of pre-computed features;

determining, utilizing the selected at least one of the plurality of machine learning models and the retrieved at least one subset of the plurality of pre-computed features, whether the given user is exhibiting at least one of the different types of potentially malicious behavior on the e-commerce platform; and responsive to determining that the given user is exhibiting said at least one of the different types of potentially malicious behavior on the e-commerce platform, initiating one or more actions on the e-commerce platform to at least one of prevent the potentially malicious behavior of the given user and mitigate an effect of the potentially malicious behavior of the given user;

wherein the determination of whether the given user is exhibiting at least one of the different types of potentially malicious behavior on the e-commerce platform is dynamically updated as the given user interacts with the e-commerce platform based at least in part on one or more updates to the plurality of pre-computed features maintained in the in-memory database; and wherein the method is performed by at least one processing device comprising a processor coupled to a memory.

19. The method of claim 18 wherein the plurality of different machine learning models comprise: a fraud detection machine learning model, a reseller detection machine learning model, and a bot detection machine learning model.

20. The method of claim 19 wherein:

responsive to the identified event type of the given event being a navigation event whereby the given user moves between two or more pages of an interface of the e-commerce platform, the selected at least one of the plurality of machine learning models comprises the bot detection machine learning model; and responsive to the identified event type of the given event being a payment event whereby the given user submits payment information to the e-commerce platform, the selected at least one of the plurality of machine learning models comprises the fraud detection machine learning model and the reseller detection machine learning model.

* * * * *